United States Patent
Takada

(10) Patent No.: US 8,160,241 B2
(45) Date of Patent: Apr. 17, 2012

(54) COMMUNICATION TERMINAL DEVICE WITH ECHO CANCELLER AND ITS ECHO CANCELING METHOD

(75) Inventor: Masashi Takada, Yokohama (JP)

(73) Assignee: Oki Electric Industry Co., Ltd., Tokyo (JP)

(*) Notice: Subject to any disclaimer, the term of this patent is extended or adjusted under 35 U.S.C. 154(b) by 1441 days.

(21) Appl. No.: 11/662,073

(22) PCT Filed: Apr. 7, 2005

(86) PCT No.: PCT/JP2005/006851
§ 371 (c)(1),
(2), (4) Date: Mar. 7, 2007

(87) PCT Pub. No.: WO2006/027868
PCT Pub. Date: Mar. 16, 2006

(65) Prior Publication Data
US 2008/0037766 A1 Feb. 14, 2008

(30) Foreign Application Priority Data
Sep. 7, 2004 (JP) ................. 2004-260039

(51) Int. Cl.
H04M 9/08 (2006.01)
(52) U.S. Cl. .................................. 379/406.15
(58) Field of Classification Search ........... 379/406.1, 379/406.15
See application file for complete search history.

(56) References Cited

U.S. PATENT DOCUMENTS
2003/0235294 A1* 12/2003 Dyba et al. .............. 379/406.01

FOREIGN PATENT DOCUMENTS
| JP | 02-026168 | 1/1990 |
| JP | 03-188718 | 8/1991 |
| JP | 06-069834 | 3/1994 |
| JP | 06-196951 | 7/1994 |
| JP | 08-237175 | 9/1996 |
| JP | 08-265224 | 10/1996 |
| JP | 09-247246 | 9/1997 |
| JP | 2004-023299 | 1/2004 |

* cited by examiner

Primary Examiner — Alexander Jamal
(74) Attorney, Agent, or Firm — Rabin & Berdo, PC

(57) ABSTRACT

An uncomfortable feeling due to lack of the speech of a far end speaker and a convergence signal voice (sound) is prevented, and the echo of the far end speaker is removed. A pseudo signal generating circuit has a phase inverter (10) for inverting the phase of a signal, a pseudo hybrid circuit (11) for generating a pseudo echo having the same or substantially the same characteristic as that of the true signal, and a pseudo telephone set (5-2). By generating a pseudo echo having the phase opposite to that of the true signal and having the same or substantially the same characteristics as that of the true signal, the uncomfortable signals (echo, etc.) are cancelled out. When a telephone set is connected to a caller or when an extension transfer occurs, an adaptive filter convergence signal is generated for a predetermined constant time only during "no-voice (sound) (silence)" of the far end speaker's signal.

19 Claims, 9 Drawing Sheets

COMMUNICATION TERMINAL DEVICE WITH ECHO CANCELLER AND ITS ECHO CANCELING METHOD

TECHNICAL FIELD

The present invention relates to a communication terminal device with an echo canceller, which can sufficiently remove a far end speaker's echo while avoiding occurrence of lack of part of a sound and occurrence of an unnecessary convergence signal sound.

BACKGROUND ART

A conventional art regarding this type of communication terminal device with an echo canceller is disclosed, for example, in Patent Document 1.

As disclosed in Patent Document 1, a conventional communication system and a conventional line switching system for controlling training of an echo canceller are configured as shown in FIG. 9.

As shown in FIG. 9, the system includes a receive input terminal Rin 100 (hereinafter referred to as an "Rin 100"), a receive output terminal Rout 102 (hereinafter referred to as an "Rout 102"), a digital-analog converter 103 (hereinafter referred to as a "D/A 103"), a two-wire/four-wire conversion hybrid circuit 104, a telephone set 105, an analog/digital converter 106 (hereinafter referred to as an "A/D 106"), a send input terminal Sin 107 (hereinafter referred to as an "Sin 107"), an echo canceling adder 108, a send output terminal Sout 109 (hereinafter referred to as an "Sout 109"), an adaptive filter 110, an echo canceller 113, a switch 112, and a signal source 111.

The operation of this system will be described with reference to FIG. 9.

In an initial state, the switch 112 is turned to a terminal 'a'.

When a call with the telephone sets 105 is first established, the switch 112 is turned to a terminal 'b'. A reference signal to be used for convergence of the adaptive filter 110 is output from the signal source 111 (i.e., reference signal source 111) and input to the terminal 'b' of the switch 112. The reference signal output from the switch 112 is input to the adaptive filter 110 and the Rout 102. The reference signal output from the Rout 102 is converted by the D/A 103 into an analog signal, which is then input to the hybrid circuit 104.

A part of the reference signal input to the hybrid circuit 104 is send to the telephone set 105, and the other of the reference signal is returned again to the echo canceller 113 via the A/D 106. More specifically, the reference signal output from the hybrid circuit 104 is converted into a digital signal, which is then input to the adder 108 via the Sin 107. A pseudo echo y' as an output from the adaptive filter 110 is input to the adder 108, and an echo signal y is cancelled out by the pseudo echo y' in the adder 108. A signal output from the adder 108 is supplied to the adaptive filter 110 and the Sout 109.

After a call is established and a predetermined constant time elapses, that is, after the adaptive filter 110 of the echo canceller 113 is converged, the switch 112 is turned to the terminal 'a' in accordance with time control of a switch controller which is not shown in the figure.

After that, when a speech starts, a sound signal from the far end speaker is input to the Rin 100, passes through the switch 112, the Rout 102, the D/A 103, and the hybrid circuit 104, and then reaches the telephone set 105.

Meanwhile, the sound signal is partially reflected by the hybrid circuit 104, and returned to the echo canceller 113. The reflected echo signal y is canceled out by the pseudo echo y' in the adder 108. Therefore, the speakers can talk to each other while no echo reaches the far end speaker, which is not shown in the figure, any longer.

Patent Document 1: Japanese Patent Application Kokai (Laid-Open) Publication No. 2004-23299

DISCLOSURE OF THE INVENTION

Problem to be Solved by the Invention

However, the above conventional system has the following problems.

(1) In the conventional art, when a call is established, the adaptive filter 110 is converged by turning the switch 112 to the terminal 'b'. At this time, "a state where a call is established" usually means such a state where a caller (i.e., a speaker who is not shown in the figure but is present at a position adjacent to the left side of FIG. 9) and a receiver (i.e., a speaker who uses the telephone set 105 in FIG. 9 and hereinafter will be referred to as a "near end speaker") can speak to each other. In such a call-established state, when a signal for causing the adaptive filter 110 to be converged is output from the signal source 111, even the near end speaker can hear the convergence signal, which gives an uncomfortable feeling to the near end speaker. In particular, when the convergence signal is such a type of signal as to cause the adaptive filter 110 to converge in a shortest time, the signal is, in many cases, an unnatural signal such as Gaussian noise different from so-called a voice. For this reason, when the convergence signal has a high level, the near end speaker has to inevitably hear undesirable large noise, which is highly a torture to the near end speaker.

Conversely to the aforementioned case, when the level of the convergence signal is reduced, a critical echo cannot have a sufficient level and thus the adaptive filter 110 cannot be converted with a sufficient accuracy. As a result, the echo during sound conversation cannot be disadvantageously removed sufficiently.

(1-2) In order to avoid the above disadvantage, there is a method for shorten the output time of the reference signal. In other words, it is considered to output the reference signal only in a short time without reducing the level of the reference signal to thereby minimize the harm of hearing the noise to the near end speaker. However, it is common to sequentially estimate an echo path in convergence of the adaptive filter of an echo canceller with use of an NLMS algorithm or the like as a known technique. In this case, a disadvantage takes place. For example, after the estimation of the adaptive filter in a short time below its necessary level is terminated, the algorithm of "sequentially" estimating the echo path cannot secure a sufficient time. As a result, the estimation of the echo path becomes insufficient, which disadvantageously leads to the fact that the adaptive filter cannot be converged and learned sufficiently so as to be able to sufficiently remove the echo during the usual conversation.

That is, the method has a defect that if a measure is adopted for avoiding the noise reception of the near end speaker, the echo during the conversation cannot be removed sufficiently.

(2) Further, since the convergence is started after part of a receive line is cut off by the switch 112 after a call is established, a part at the beginning of a voice of the far end speaker becomes missing disadvantageously. It is a daily experience to speak over the near end speaker, saying "hallo" and so on at the beginning of the established call. Thus, if part of a calling voice or a greeting voice is missing, then it disadvantageously gives an unnatural feeling to the call receiver.

As a simple solving method of avoiding such lack of the beginning part of the voice from the far end speaker, it is also considered to replace the switch 112 in the conventional art with an adder to mix and output the voice of the far end speaker and the signal for causing the adaptive filter to converge. However, as mentioned above, the most effective convergence signal corresponds in most cases to an unnatural signal such as Gaussian noise, and the near end speaker still feels such a signal noisy. Even when the reference signal of such a level that the near end speaker feels it less noisy is mixed, on the other hand, the adaptive filter 110 cannot be sufficiently converged, and the echo removal during natural sound conversation cannot be attained sufficiently. Even when the adaptive filter is converted in an excessively short time, there still exists such a defect as mentioned above.

The present invention has been made in view of the above defects, and it is therefore an object of the present invention to obtain a communication terminal device with an echo canceller which can sufficiently remove an echo of the far end speaker while avoiding occurrence of lack of part of the far end speaker's voice and avoiding a near end speaker from feeling noisy caused by an unnecessary convergence signal, and also its echo canceling method.

Means for Solving the Problem

In order to solve the above problems, the present invention is characterized by including a pseudo signal generating circuit which has the same or substantially the same characteristic as that of a circuit for generating a true echo, the pseudo signal generating circuit generating a pseudo echo having a phase opposite to that of the true echo for canceling the true echo.

The pseudo signal generating circuit may include a pseudo hybrid circuit and a pseudo telephone set, and also include a pseudo pass transfer function calculator for simulating the pass transfer function of the hybrid circuit, a pseudo pass transfer function filter for simulating the pass transfer function of the hybrid circuit, or an adaptive pseudo pass transfer function filter for generating a pseudo hybrid circuit pass signal. The pseudo signal generating circuit is converged during a no-sound state.

The echo canceling method of the communication terminal device for removing an echo during communication is characterized by having the same or substantially the same characteristic as that of the circuit for generating the true echo and generating a pseudo echo having the phase opposite to that of the true echo to cancel the true echo.

Effects of the Invention

Occurrence of lack of part of the far end speaker's voice is avoided, and the near end speaker is prevented from hearing an unnecessary convergence signal and feeling it uncomfortable. In addition, the echo of the far end speaker can be removed sufficiently.

DESCRIPTION OF REFERENCE NUMERALS

1 receive input terminal Rin; 2 receive output terminal Rout; 3 digital-to-analog converter; 4 hybrid circuit; 5-1 telephone set; 5-2 pseudo telephone set Ztel; 5-3 telephone set; 6 analog-to-digital converter; 7 send input terminal Sin; 8 send output terminal Sout; 10 phase inverter; 11 pseudo hybrid circuit; 12 communication terminal device with echo canceller; 20 phase inverter; 21 digital-to-analog converter; 30 reference signal generator; 31 phase inverter; 32 D/A; 33 pseudo pass transfer function calculator; 34 adaptive filter; 35 adder; 40 pseudo pass transfer function filter; 50 A/D; 51 adaptive pseudo pass transfer function filter; 54 telephone set; 60 call control device; 61 voice detector; 62 reference signal generator; 64 telephone set.

BEST MODE FOR CARRYING OUT THE INVENTION

A communication terminal device with an echo canceller and its echo canceling method according to embodiments of the present invention will be described below with reference to the attached drawings.

First Embodiment

Figure 1:
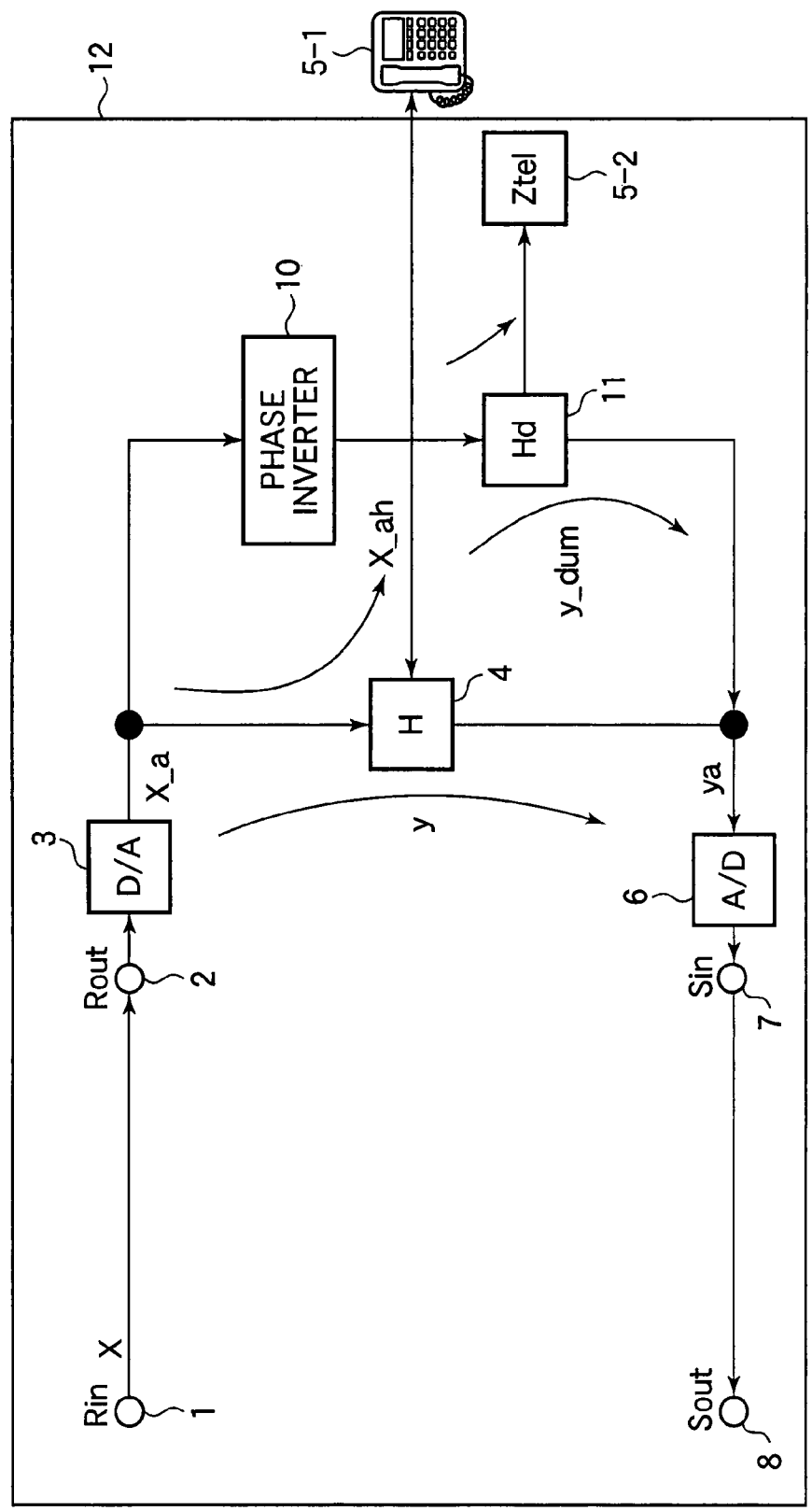
FIG. 1 is a schematic block diagram showing a communication terminal device with an echo canceller according to the first embodiment of the present invention.

FIG. 1 is a schematic block diagram showing a communication terminal device with an echo canceller according to the first embodiment of the present invention. Referring to FIG. 1, a reference numeral 1 denotes a receive input terminal Rin (hereinafter referred to as an "Rin 1"), a reference numeral 2 denotes a receive output terminal Rout (hereinafter referred to as an "Rin 2"), a reference numeral 3 denotes a digital-to-analog converter (hereinafter referred to as a "D/A 3"), a reference numeral 4 denotes a hybrid circuit, a reference numeral 5-1 denotes a telephone set, a reference numeral 6 denotes an analog-to-digital converter (hereinafter referred to as an "A/D 6"), a reference numeral 7 denotes a send input terminal Sin (hereinafter referred to as an "Sin 7"), a reference numeral 8 denotes a send output terminal Sout (hereinafter referred to as an "Sout 8"), a reference numeral 11 denotes a pseudo hybrid circuit, a reference numeral 5-2 denotes a pseudo telephone set Ztel (hereinafter referred to as a "Ztel 5-2"), and a reference numeral 10 denotes a phase inverter. The above constituent elements form an entire communication terminal device 12 with an echo canceller.

In this case, the pseudo hybrid circuit 11 is a pseudo signal generating circuit of the hybrid circuit 4. As the pseudo hybrid circuit 11, any type of pseudo hybrid circuit may be employed, so long as the circuit has the same reflection transfer function and pass transfer function as those of the hybrid circuit 4. The pseudo hybrid circuit is not specifically limited in arrangement and any arrangement may be employed for the hybrid circuit. As a simple form of the pseudo hybrid circuit 11, the same type of product as the hybrid circuit 4 may be employed.

The Ztel 5-2 is the pseudo signal generating circuit of the telephone set 5-1. Any type of the Ztel 5-2 may be employed so long as the circuit can have the same electric impedance as that of the telephone set 5-1, and the Ztel 5-2 is not specifically limited in arrangement. For example, the Ztel may be a very simple circuit having no communication function, such as a resistive element of 600 ohms as the simplest example.

The phase inverter 10, the pseudo hybrid circuit 11, and the Ztel 5-2 form a means for generating a pseudo echo having an inverse phase.

<Echo Canceling Method in First Embodiment>

The communication terminal device 12 with the echo canceller arranged as mentioned above operates as follows. The operation of the communication terminal device 12 with the echo canceller will be described below with reference to FIG. 1.

A sound signal (digital sound) sent from a speaker, who is not shown in the figure, (hereinafter referred to as a "far end speaker") located at a remote distance is input to the Rin 1, sent via the Rout 2 to the D/A 3, where the sound signal is converted into an analog signal $X\_a$, and then input to the hybrid circuit 4 and the phase inverter 10.

The signal $X\_a$ input to the hybrid circuit 4 is output from the hybrid circuit 4 toward the telephone set 5-1, but part of the signal is reflected and input to the A/D 6 as an echo signal y. As well known, the echo signal y is convoluted with a reflection transfer function Hy and the signal $X\_a$ at the hybrid circuit 4, and thus expressed by the following equation (1).

$$y = Hy * X\_a \quad (1)$$

where a mark * denotes convolution.

Meanwhile, the signal output from the hybrid circuit 4 toward the telephone set 5-1 is also expressed as a convolution with a pass transfer function Hg as another characteristic of the hybrid circuit 4 and with the signal $X\_a$, that is, by an equation (2) which follows. In other words, the hybrid circuit 4 is such an element that exhibits the characteristic of Hy in a direction toward the send input terminal and exhibits the characteristic of Hg in a direction toward the telephone set 5-1 with respect to its input signal.

$$X\_ah = Hg * X\_a \quad (2)$$

Meanwhile, the signal $X\_a$ sent from the D/A 3 to the phase inverter 10 is inverted with respect to phase to form a signal $-X\_a$ and then input to the pseudo hybrid circuit 11. In the pseudo hybrid circuit 11, part of the input signal is reflected to form a pseudo echo signal y_dum, and the rest of the input signal is supplied to the Ztel 5-2.

Similarly to the aforementioned echo signal, the pseudo echo signal y_dum is expressed as a convolution with a reflection transfer function Hy_dum and the signal $X\_a$ at the pseudo hybrid circuit 11, and thus can be expressed by the following equation (3).

$$y\_dum = Hy\_dum * (-X\_a) \quad (3)$$

Meanwhile, a signal Xd_ah sent from the pseudo hybrid circuit 11 toward the Ztel 5-2 is also expressed as a convolution with the pass transfer function Hg of the hybrid circuit 4 and the signal $X\_a$, and thus can be expressed by the following equation (4).

$$Xd\_ah = Hg\_dum * (-X\_a) \quad (4)$$

Since an equation (5) which follows is satisfied as mentioned above, $$Hy\_dum \approx Hy \quad (5)$$

a signal ya that is input to the A/D 6 corresponds to an analog addition signal of the echo signal y and the pseudo echo signal y_dum. In other words, this signal is expressed by the following equation (6).

$$\begin{aligned} ya &= y + y\_dum \\ &= Hy * X\_a + (Hy\_dum * (-X\_a)) \\ &\approx Hy * X\_a + (Hy * (-X\_a)) \\ &= (X\_a - X\_a) * Hy \end{aligned} \quad (6)$$

This means the echo has been eliminated.

The signal ya is converted by the A/D 6 to a digital signal yd, and then supplied to the far end speaker, who is not shown in the figure, via the send input terminal Sin 7 and the send output terminal Sout 8.

<Effects of First Embodiment>

As mentioned above, the first embodiment of the present invention has effects which follow.

Since the analog sound signal from the far end is inverted by the phase inverter 10 and the pseudo echo is generated by the pseudo hybrid circuit 11 and the Ztel 5-2 to cause the pseudo echo and the true echo to cancel each other on an analog line, the need of training for the echo cancellation can be eliminated.

As a result, the near end speaker can be prevented from hearing the training noise and feeling it uncomfortable, while the echo can be removed sufficiently.

Further, since the echo canceling function works from the beginning of the far end speaker's voice, occurrence of lack of the beginning part of the far end speaker's voice can be avoided.

As a result, a communication terminal device with an echo canceller having an excellent speech quality can be provided.

Second Embodiment

The second embodiment of the present invention will next be described.

Figure 2:
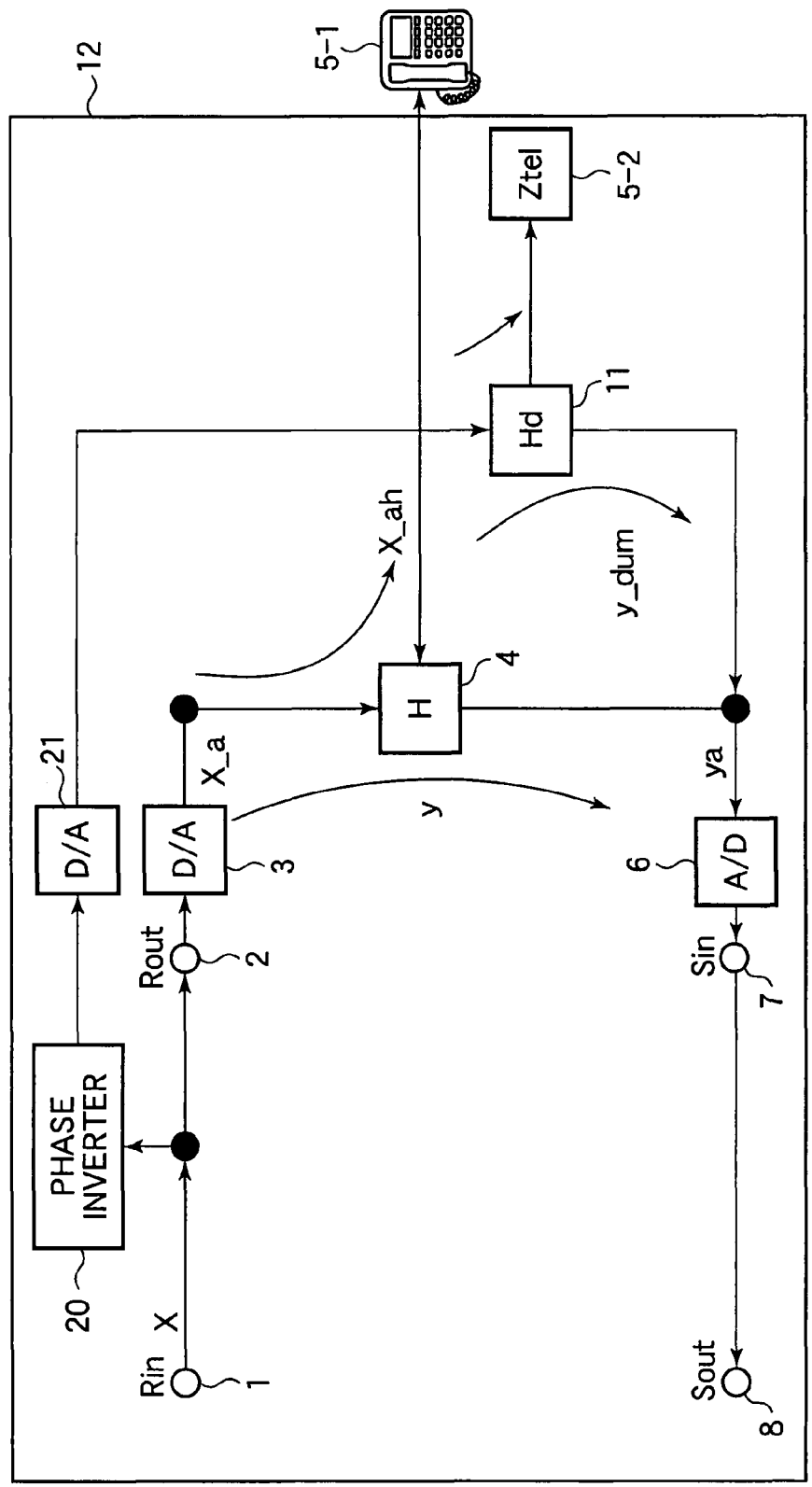
FIG. 2 is a schematic block diagram showing a communication terminal device with an echo canceller according to the second embodiment of the present invention.

FIG. 2 is a schematic block diagram showing a communication terminal device with an echo canceller according to the second embodiment of the present invention. The most parts of the entire arrangement of the communication terminal device with the echo canceller according to this embodiment are the same as those of the communication terminal device according to the aforementioned first embodiment. Thus, the constituent elements that are the same as those in the first embodiment are assigned the same reference numerals or symbols, and a description will be made with attaching importance of different constituent elements while a description of the same constituent elements is omitted.

The communication terminal device with the echo canceller according to this embodiment is different from the communication terminal device with the echo canceller according to the first embodiment in the respect that the phase inverter 10 is modified. The phase inverter 10 for the analog signal provided at the preceding stage of the pseudo hybrid circuit 11 is removed, a phase inverter 20 for a digital signal is newly provided, and a digital-to-analog converter 21 is provided between the pseudo hybrid circuit 11 and the phase inverter 20.

The phase inverter 20 is connected to a part disposed between the Rin 1 and the Rout 2 to directly receive a digital signal as a far end speaker's signal X and to convert it into an analog signal. The phase inverter 20 is composed of a DSP, an inverter element, and the like. In general, inversion of the sound waveform of a digital signal can be carried out only by, for example, multiplying the signal waveform by −1 using a DSP for example, and this operation can be highly simply attained. As a matter of course, the inversion may also be achieved by using an inverter element for a digital circuit.

The digital-to-analog converter 21 converts a signal having a phase that has been inverted by the phase inverter 20.

Except for the above-described points, the communication terminal device with the echo canceller according to this embodiment is the same as that according to the first embodiment.

<Echo Canceling Method in Second Embodiment>

The communication terminal device with the echo canceller arranged that has the above-mentioned configuration operates as follows. The operation of the communication terminal device with the echo canceller will be described with reference to FIG. 2.

A difference in operation between the communication terminal devices of the first and second embodiments lies in the phase inverter 20 and the digital-to-analog converter 21. Since the other operation of this embodiment is the same as that of the first embodiment, the same description as that of the first embodiment is omitted here.

The far end speaker's signal (digital signal) X is input to the Rout 2 and the phase inverter 20. The signal X input to the phase inverter 20 is phase inverted by the phase inverter 20. The phase inversion is carried out, for example, by multiplying the signal waveform by −1 using a DSP. Instead of this, the phase inversion may be attained by using an inverter element for a digital circuit.

The signal phase-inverted by the phase inverter 20 is input to the digital-to-analog converter 21, and the input signal is converted into an analog signal X_a2. The analog signal X_a2 is input to the pseudo hybrid circuit 11, and then the device according to this embodiment operates in substantially the same manner as that of the first embodiment.

<Effects of Second Embodiment>

When the phase inverter 10 for the analog signal is used as in the first embodiment, a situation that the phase inverter 10 has an impedance component of an unnegligible magnitude may occur in some cases. When the phase inverter 10 has a small impedance component, it involves no problem. However, as the impedance component becomes large, for the purpose of making the pseudo echo signal y_dum to approach the true echo y, it is required that an impedance of a combination of three of the phase inverter 10, the pseudo hybrid circuit 11, and the pseudo telephone set Ztel 5-2 be adjusted to coincide with an impedance of a combination of the hybrid circuit 4 and the telephone set 5-1. However, the adjustment of making these impedances to coincide with each other is not easy, which requires a lot of experience in the design of the analog circuit.

The use of the phase inverter 20 for the digital signal, to the contrary, enables the phase inversion to be executed on a digital signal. Thus this method can achieve the phase inversion highly easily.

More specifically, when components having the same types (sorts) as the hybrid circuit 4 and the pseudo hybrid circuit 11 are used, it is only required for the designer to make the impedance of the Ztel 5-2 to coincide with the impedance of the telephone set 5-1, thus eliminating the need of special experience in design and adjustment.

In this way, the device design can be made easy and the matching target can be restricted to the hybrid circuit 4 and the pseudo hybrid circuit 11 in a one-to-one relation as mentioned above. As a result, the adjustment accuracy can be increased and the echo removal accuracy can be increased.

Although the pseudo echo and the true echo have been made to cancel each other on the analog line in this embodiment, this echo cancellation may be arranged to be attained on a digital line. In this case, the pseudo echo may be once converted into a digital signal by another A/D, which is not shown in the figure, and then supplied to a digital adder, which is not shown in the figure, provided between the A/D 6 and the Sout 8 so that the digital adder performs the echo cancellation.

Even in this case, the same effects as in the above second embodiment can be obtained.

Third Embodiment

The third embodiment of the present invention will next be described.

Figure 3:
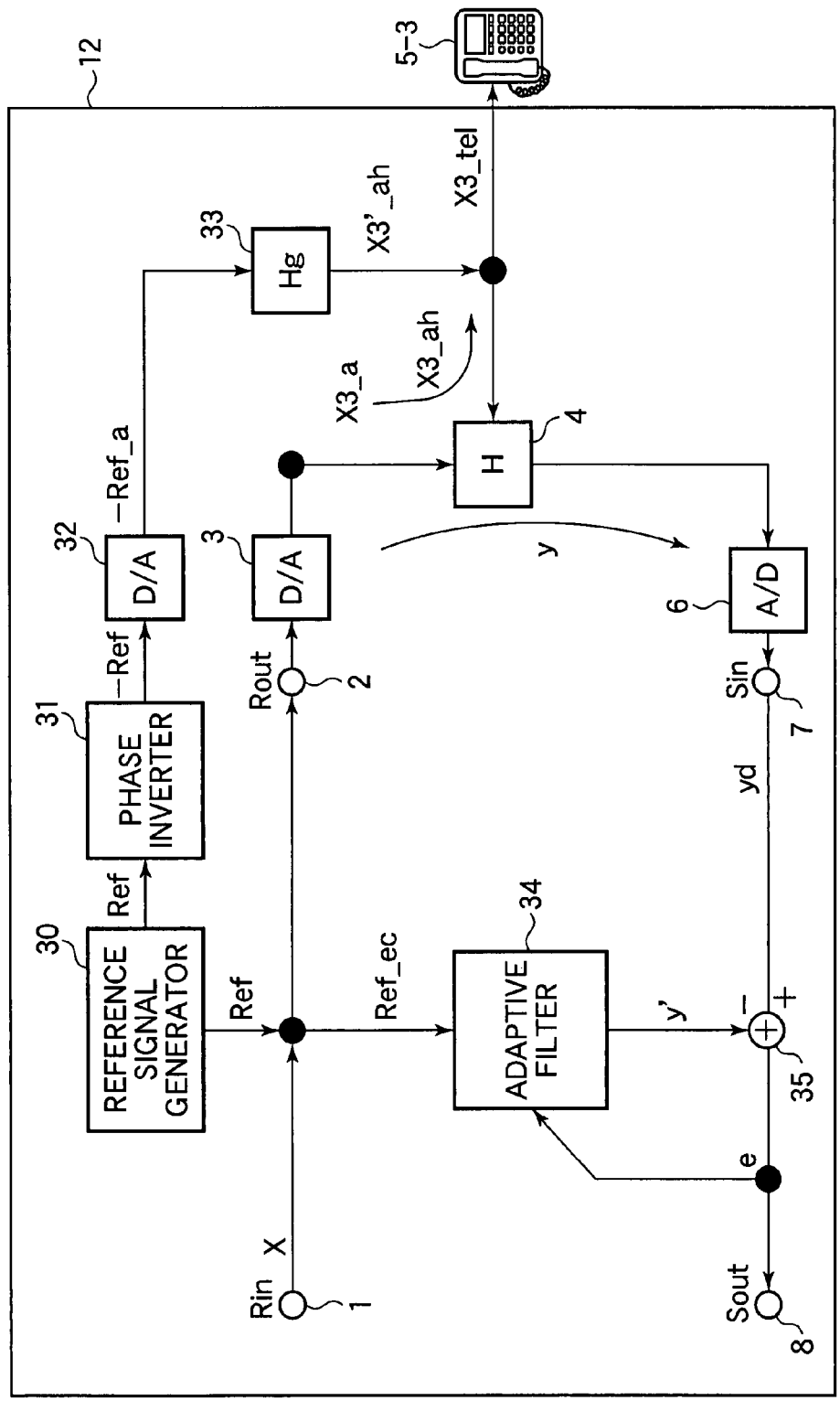
FIG. 3 is a schematic block diagram showing a communication terminal device with an echo canceller according to the third embodiment of the present invention.

FIG. 3 is a schematic block diagram showing a communication terminal device with an echo canceller according to the third embodiment of the present invention.

The most parts of the entire arrangement of the communication terminal device with the echo canceller according to this embodiment are the same as those of the communication terminal device according to the aforementioned second embodiment. Thus, the constituent elements that are the same as those in the second embodiment are assigned the same reference numerals or symbols, and a description will be made with attaching importance of different constituent elements while a description of the same constituent elements is omitted.

This embodiment is designed to take the free replacement of a telephone set by a near end speaker into consideration. In the first and second embodiments, the pseudo telephone set Ztel 5-2 and the pseudo hybrid circuit 11 have been used to simulate the pass transfer function Hg and reflection transfer function Hy of the hybrid circuit 4 and to create a pseudo echo. When the telephone set 5-1 is not replaced with another one as in the first and second embodiments, for example, when the device is accommodated in a single casing including the telephone set 5-1, no problem occurs. However, when an exchangeable telephone set is to be used, it is hard for the first and second embodiments to meet the requirement. That is, when it is desired to attain a communication terminal device with an echo canceller wherein only a telephone set is replaceable, for the purpose of echo removal, it is required to make the impedance of the pseudo telephone set Ztel 5-2 to coincide with that of a new telephone set upon each replacement of the telephone set.

The need of disassembling the terminal device, exchanging and adjusting a component upon each replacement of the telephone set by the telephone set user requires a technical experience. Thus this is highly difficult to realize it. In view of such respects, this embodiment has been provided. In this embodiment, a pseudo pass transfer function calculator 33 to be described later is provided to eliminate the need for the near end speaker to exchange and adjust the pseudo telephone set 5-2 with complicated skill. Further, an adaptive filter 34 is provided to automatically and suitably remove the echo of the far end speaker and to prevent the near end speaker from hearing the convergence signal for convergence of the adaptive filter 34, that is, to avoid the near end speaker from feeling noisy due to the convergence signal.

In this way, in order to remove the echo by simulating the reflection transfer function Hy, the terminal device designed to exchange a telephone set employs an echo canceller as a well-known art. The echo canceller includes an adaptive filter which is caused to learn (converge and agree) so as to simulate the reflection transfer function Hy at the beginning of a speech. In other words, for the leaning, an Hy converging input and the echo y reflecting the Hy characteristic are input to the echo canceller. The operation is carried out according to an algorithm. More specifically, the convergence signal passes through the hybrid circuit 4 and the adaptive filter 34 to be described later, so that the characteristic of the adaptive filter 34 gradually simulates the characteristic Hy of the hybrid circuit 4, with the result that the echo is successively canceled to minimize the power of a signal 'e'. The algorithm may be an NLMS algorithm, an LMS algorithm, or the like. In this connection, the algorithm is not limited to the specific example and may be another algorithm. Any algorithm may be used so long as it makes a residue signal 'e' minimum using a signal Ref_ec, a digital-converted echo yd and the residue output 'e' of an adder 35.

The invention described in this embodiment utilizes the fact that the pass transfer function of the hybrid circuit 4 can be frequently simulated with a relatively simple element. Specific embodiments of the present invention will be described.

The communication terminal device of this embodiment is different from the communication terminal device of the second embodiment in the respect that the pseudo hybrid circuit 11 and the pseudo telephone set 5-2 are removed; an adaptive filter 34, an adder 35, a reference signal generator 30, a phase inverter 31, a D/A 32, and a pseudo pass transfer function calculator 33 are newly provided; and the telephone set 5-1 is replaced with a telephone set 5-3. Except for the above-described points, the communication terminal device with the echo canceller according to this embodiment is the same as that according to the second embodiment.

Among the constituent elements of this embodiment, the adaptive filter 34, the adder 35, the reference signal generator 30, the phase inverter 31, and the D/A 32 have known functions, and therefore their descriptions are unnecessary.

The pseudo pass transfer function calculator 33 is an element which has a characteristic of a simulation of the pass transfer function Hg of the hybrid circuit 4. The pseudo pass transfer function calculator 33 is composed of an attenuator, a resistance, and the like. The pseudo pass transfer function calculator 33 is arranged to be exchangeable. More specifically, the attenuator, the resistance, and the like is housed in a socket (not shown), so that the pass transfer function of the pseudo pass transfer function calculator 33 can be changed by replacing the socket.

When such a method as to simply exchange a predetermined pseudo pass transfer function calculator such as a resistance element is used, that is, when a resistance element connected to a socket, which is not shown in the figure, is exchanged, for example; the near end speaker can easily exchange it while eliminating the need for special experience and adjustment.

<Echo Canceling Method in Third Embodiment>

The communication terminal device with the echo canceller arranged as mentioned above operates as follows. The operation of the communication terminal device will be described below with reference to FIG. 3.

The far end speaker's signal X input to the Rin 1 is first supplied to the adaptive filter 34 and the Rout 2. An adaptive filter convergence signal Ref from the reference signal generator 30 is input to the adaptive filter 34, and also input to the Rout 2 and the phase inverter 31.

The phase inverter 31 inverts the signal Ref to form a signal −Ref. An output of the phase inverter 31 is converted by the D/A 32 into an analog signal −Ref_a. Next, the signal −Ref_a is input to the pseudo pass transfer function calculator 33.

Meanwhile, the signals X and Ref are supplied to the Rout 2 and then supplied to the D/A 3 to form an analog signal X3_a. Accordingly, the signal X3_a is expressed by the following equation (6).

$$X3\_a = X\_a + Ref\_a \quad (6)$$

where X_a and Ref_a denotes signals after the signals X and Ref are converted into analog signals respectively.

Meanwhile, an inversion output signal −Ref_a output from the D/A 32 is input to the pseudo pass, transfer function calculator 33 to generate a signal X3'_ah, which is expressed by the following equation (7).

$$X3'\_ah = Hg\_dum*(-Ref\_a) \quad (7)$$

Meanwhile, a mixture signal Ref_ec of the signals X_a and Ref_a is input to the adaptive filter 34. As has already been described above, the adaptive filter 34 estimates the reflection transfer function Hy of the hybrid circuit 4 and generates a pseudo echo y' according to the sequential algorithm so as to make the residue signal 'e' minimum with use of the signal Ref_ec, the digital-converted echo yd, and the residue output 'e' of the adder 35. Used as the algorithm for creation of the pseudo echo is such an NLMS algorithm, an LMS algorithm, or the like as mentioned above as a known algorithm. The detail description of the algorithm is omitted here.

The adaptive filter 34 may be converged once "after a call is established for the first time" from connection of the telephone set 5-3 to the hybrid circuit 4 or may be converged "for each established call."

With such an arrangement, the generation of an echo can be suppressed.

Meanwhile, as has been mentioned in the first embodiment, the signal X3_a is provided with the reflection transfer function Hy and the pass transfer function Hg in the hybrid circuit 4 to generate the signals y and X3_ah as expressed by equations (8) and (9) which follow.

$$y = Hy*C(X3\_a + Ref\_a) \quad (8)$$

$$X3\_ah = Hg*(X3\_a + Ref\_a) \quad (9)$$

The signal X3_ah supplied from the hybrid circuit 4 to the telephone set 5-3 is added, in analog form, to the output X3'_ah from the pseudo pass transfer function calculator 33 to generate a signal X3_tel. In this example, the addition is expressed by an equation (10), with the signal Ref_a for convergence of the adaptive filter removed.

$$\begin{aligned} X3\_tel &= X3\_ah + X3'\_ah \quad (10) \\ &= Hg\_dum*(-Ref\_a) + Hg*(X3\_a + Ref\_a) \\ &\approx Hg*((-Ref\_a) + (X3\_a + Ref\_a)) \\ &= Hg*X3\_a \end{aligned}$$

In the equation (10), a relation, $Hg\_dum \approx Hg$, is satisfied.

Hence, the signal Ref_a is removed and the near end speaker can be suppressed from hearing the training signal.

<Effects of Third Embodiment>

As has been described above, the pass transfer function Hg of the hybrid circuit 4 is simulated by the pseudo pass transfer function calculator 33 to create the pseudo reference signal (−Ref_a) having the phase opposite to that of the true reference signal (Ref) and to cancel the signal X3_ah. As a result, the near end speaker can be prevented from hearing the signal for convergence of the adaptive filter 34 or from feeling uncomfortable due to the convergence signal.

A signal which lasts for a long time and has a suitably high level may be used as the signal for convergence of the adaptive filter 34 to accurately cause the adaptive filter 34 of the echo canceller to converge and to remove the echo.

As a result, there can be obtained a terminal which can comfortably talk over the party without any occurrence of lack of part of the far end speaker's voice.

The pseudo pass transfer function calculator 33 can be exchanged as necessary with a calculator having a different resistive value in the form of socket exchange. Therefore, since the need of special experience and adjustment can be eliminated and the near end speaker can easily exchange the pseudo pass transfer function calculator 33, the telephone set can be freely selected with a high flexibility.

Fourth Embodiment

The fourth embodiment of the present invention will next be described.

Figure 4:
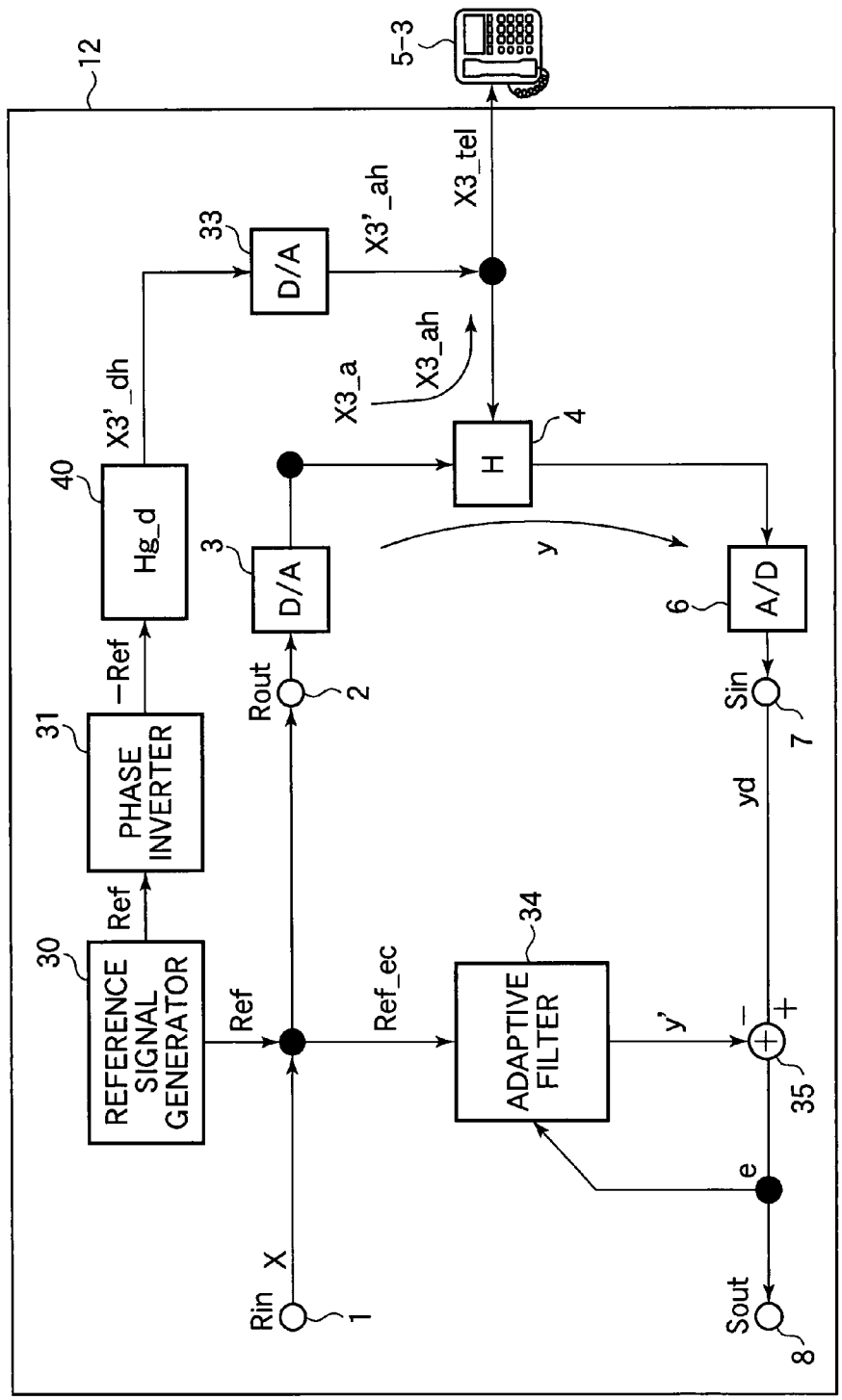
FIG. 4 is a schematic block diagram showing a communication terminal device with an echo canceller according to the fourth embodiment of the present invention.

FIG. 4 is a schematic block diagram showing a communication terminal device with an echo canceller according to the fourth embodiment of the present invention. The most parts of the entire arrangement of the communication terminal device with the echo canceller according to this embodiment are the same as those of the communication terminal device according to the aforementioned third embodiment. Thus, the constituent elements that are the same as those in the third embodiment are assigned the same reference numerals or symbols, and a description will be made with attaching importance of different constituent elements while a description of the same constituent elements is omitted.

This embodiment is different from the third embodiment in the respect that the pseudo pass transfer function calculator 33 is removed and a pseudo pass transfer function filter 40 is provided. Since the other arrangement of this embodiment is the same as that of the third embodiment, its description is omitted here.

The pseudo pass transfer function filter 40 is composed of a digital filter. For example, the pseudo pass transfer function filter 40 is composed of a digital FIR filter (i.e., a filter which is a finite-duration impulse response type filter with a finite tap length) or a digital IIR filter (i.e., a filter which is an infinite-duration impulse response type with a finite tap length). Since the digital FIR filter and the IIR filter are well known arts, their descriptions are omitted here.

Coefficients (not shown) of the digital filter are previously set so as to simulate the pass transfer function Hg of the hybrid circuit 4. Further, several sorts of simulation sets of the coefficients are also previously prepared. The sorts of the simulation sets are simulated by the designer who actually measures the hybrid circuit pass transfer functions of several typical telephone sets. Filter coefficient sets thus obtained are previously prepared in a memory, which is not shown in the figure. The memory is previously arranged to be suitably selected by a selection switch, which is not shown in the figure, or the like. With such an arrangement, when the near end speaker exchanges the telephone set 5-3 with another one, she/he selects desired coefficients with use of the selection switch or the like.

<Echo Canceling Method in Fourth Embodiment>

The communication terminal device with the echo canceller arranged as mentioned above operates as follows. The operation of the communication terminal device will be described below with reference to FIG. 4. Further, a description will be made with attaching importance of the pseudo pass transfer function filter 40.

An output −Ref of the phase inverter 31 is supplied to the pseudo pass transfer function filter 40. In the pseudo pass transfer function filter 40, the output −Ref obtains a characteristic corresponding to a simulation of a pass transfer function Hg_d.

A signal X3'_dh having the characteristic simulated with the pass transfer function Hg_d by the pseudo pass transfer function filter 40 is supplied to the D/A 32 to be converted into an analog signal X3'_ah as an output thereof. As mentioned in the third embodiment, the signal X3'_ah to be input to the telephone set 5-3 is canceled by the reference signal to be input to the telephone set via the hybrid circuit.

After the near end speaker exchanges the telephone set 5-3 with another one, she/he switches the selection switch or the like to select desired coefficients.

<Effects of Fourth Embodiment>

As mentioned above, the pseudo pass transfer function filter 40 is used in place of the pseudo pass transfer function calculator 33 in the third embodiment. Thus, the need for the near end speaker to exchange the pseudo pass transfer function calculator 33 implemented with a resistance element or the like can be eliminated, and it is only required to select the characteristic of one of the pseudo pass transfer function filters 40 having several characteristics previously determined by a switch, which is not shown in the figure, or the like.

As mentioned above, the near end speaker can be prevented from hearing the echo convergence signal by canceling the echo convergence signal by the output of the pseudo pass transfer function filter 40. As a result, the adaptive filter 34 of the echo canceller can be converged and the echo can be removed accurately with use of a long-lasting signal as the adaptive filter 34 convergence signal.

Further, the near end speaker can be avoided from hearing the noise, that is, from feeling uncomfortable.

Furthermore, even for the far end speaker, the convergence signal of a sufficient level can be used as the signal for convergence of the adaptive filter 34 to accurately cause the adaptive filter 34 of the echo canceller to converge and to remove the echo.

In addition, comfortable speech between the far end speaker and the near end speaker can be established with no occurrence of lack of part of the sound to be transmitted from the far end speaker to the near end speaker.

Fifth Embodiment

The fifth embodiment of the present invention will next be described.

Figure 5:
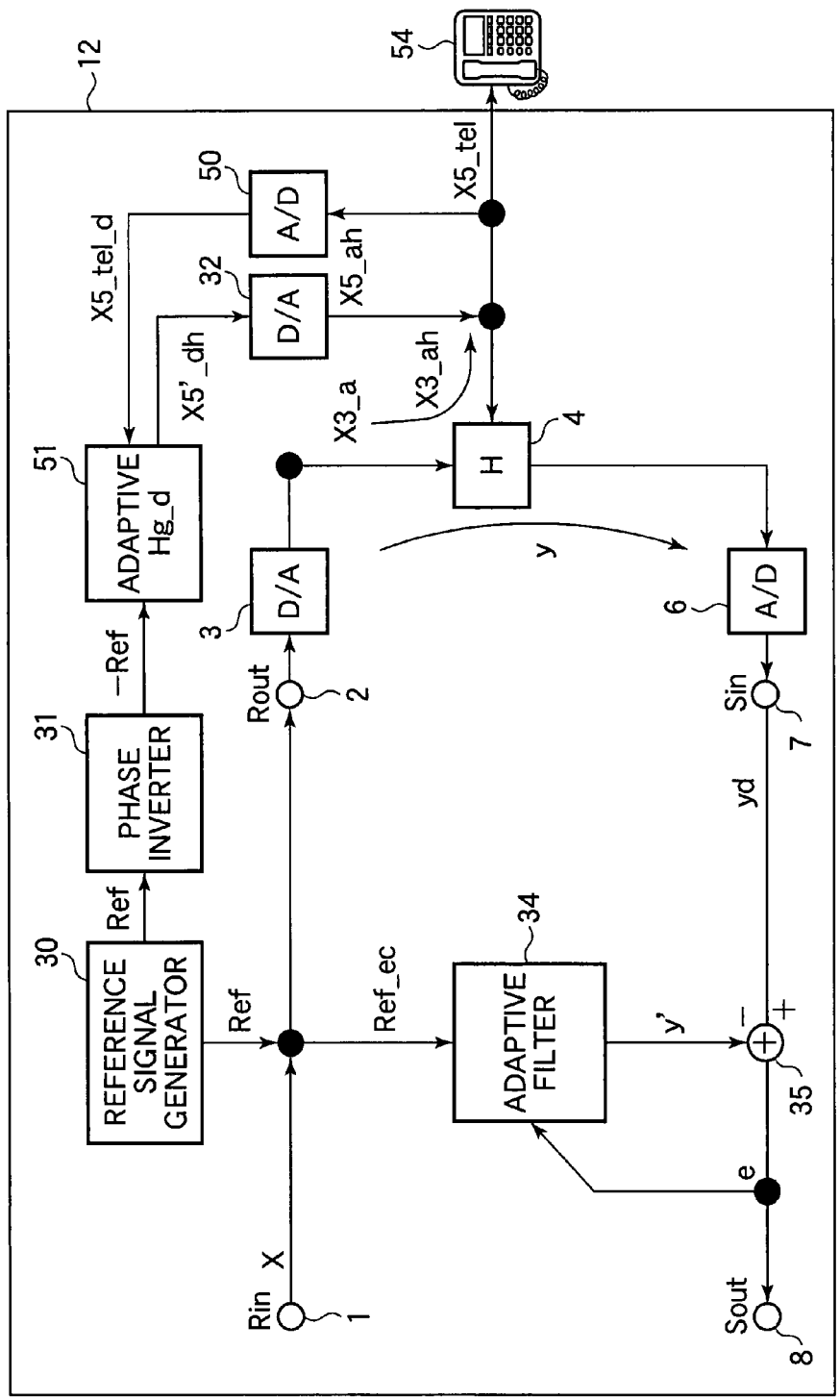
FIG. 5 is a schematic block diagram showing a communication terminal device with an echo canceller according to the fifth embodiment of the present invention.

FIG. 5 is a schematic block diagram showing a communication terminal device with an echo canceller according to the fifth embodiment of the present invention. The most parts of the entire arrangement of the communication terminal device with the echo canceller according to this embodiment are the same as those of the communication terminal device according to the aforementioned fourth embodiment. Thus, the constituent elements that are the same as those in the fourth embodiment are assigned the same reference numerals or symbols, and a description will be made with attaching importance of different constituent elements while a description of the same constituent elements is omitted.

This embodiment is different from the fourth embodiment in the respect that an A/D 50 is newly provided, the pseudo pass transfer function filter 40 is removed, and an adaptive pseudo pass transfer function filter 51 is newly provided. Since the other arrangement of this embodiment is the same as that of the fourth embodiment, its description is omitted here.

This embodiment is arranged to cope with such a situation that a telephone set 54 to be connected to the hybrid circuit 4 is not determined yet or is to be frequently changed. In the fourth embodiment, the designer previously sets typical characteristics of the pass transfer function Hg in the pseudo pass transfer function filter 40. For example, when a telephone set to be connected to the hybrid circuit 4 is not available on the market at the time point of designing the communication terminal device 12, the designer cannot know the characteristic of the telephone set and therefore such a disadvantage takes place as she/he cannot closely measure the characteristic of the pseudo pass transfer function filter 40. This is because the true pass transfer function Hg is more or less influenced also by the characteristic of the telephone set 5-3 (or 54) connected to the hybrid circuit 4.

As has been mentioned above, this embodiment is arranged so that, even when such a telephone set 54 as to hardly know its characteristic previously is connected, such a telephone set can be employed without any trouble. To this end, the adaptive pseudo pass transfer function filter 51 is provided to cause the adaptive pseudo pass transfer function filter 51 or the adaptive filter 34 to converge. As a result, when the near end speaker hears the convergence signal for convergence of the adaptive pseudo pass transfer function filter 51, she/he can avoid from feeling uncomfortable. Since the adaptive filter 34 can be sufficiently converged, the far end speaker can avoid from hearing the echo and also can suppress an unnatural or uncomfortable feeling due to the occurrence of lack of part of the sound to be transmitted from the far end speaker to the near end speaker.

The adaptive pseudo pass transfer function filter 51 generates a pseudo hybrid circuit pass signal X5'_dh. The pseudo hybrid circuit pass signal X5' dh generated by the adaptive pseudo pass transfer function filter 51 is a signal corresponding to a simulation of the reference signal −Ref passing through the hybrid circuit 4. In other words, the pseudo hybrid circuit pass signal X5'_dh is a signal for canceling the signal X3_ah. More specifically, the pseudo hybrid circuit pass signal X5'_dh is a signal for canceling the signal X3_ah obtained after the signal Ref output from the reference signal generator 30 is phase inverted to −Ref by phase inverter, and −Ref is converted by the D/A 3 into an analog signal and then passed through the hybrid circuit 4.

As the adaptive algorithm of the adaptive pseudo pass transfer function filter 51, an LMS algorithm, an NLMS algorithm, or the like is used similarly to the adaptive filter 34. The adaptive filter 34 is operated to minimize the power of the output 'e' of the adder 35, whereas, the adaptive pseudo pass transfer function filter 51 is operated to adaptively learn successively to make the power of a signal X5_tel zero. Though the signals X3_ah and X5'_ah have been added together in the form of analog signals in this embodiment, a digital adder (not shown) may be used like the adaptive filter 34 as another method. That is, a D/A may be provided at the latter stage of the hybrid circuit 4, an A/D be provided at the latter stage of the D/A, and an adder, which is not shown in the figure, be provided between the A/D and the D/A to add the aforementioned signals in the form of digital signals, as a matter of course.

<Echo Canceling Method in Fifth Embodiment>

The communication terminal device with the echo canceller arranged as mentioned above operates as follows. The operation of the communication terminal device with the echo canceller will be described below with reference to FIG. 5. In this example, a description will be made with attaching importance of the adaptive pseudo pass transfer function filter 51.

An output −Ref from the phase inverter 31 is input to the adaptive pseudo pass transfer function filter 51. The adaptive pseudo pass transfer function filter 51 generates a pseudo hybrid circuit pass signal X5'_dh.

Further, only when the near end speaker connects the telephone set 54 to the hybrid circuit 4 for the first time, the reference signal generator 30 generates the reference signal Ref for convergence of the adaptive pseudo pass transfer function filter 51 under control of a control signal from a switch, which is not shown in the figure, operated by the near end speaker. The signal Ref is converted by the phase inverter 31 into a signal −Ref and then supplied to the adaptive pseudo pass transfer function filter 51. The adaptive pseudo pass transfer function filter 51 successively learns coefficients using the signals −Ref and X5_tel_d in such a manner that the power of a signal X5'_tel_d becomes minimum. A pseudo signal X5'_dh is converted by the D/A 32 into an analog signal and then added to a signal X3_ah on an analog signal line to generate a signal X5_tel. The signal X5_tel is converted by the A/D 50 into a digital signal X5_tel_d, and then supplied to the adaptive pseudo pass transfer function filter 51 to update the coefficients (not shown) of the adaptive pseudo pass transfer function filter 51 as already mentioned above. As a result, the coefficients of the adaptive pseudo pass transfer function filter 51 are caused to learn and updated according to the above algorithm to minimize the power of the signal X5_tel. Thereafter, the adaptive pseudo pass transfer function filter 51 functions with use of the coefficients.

When another telephone set 54 is connected to the hybrid circuit 4, similar operation to the above is repeated to identify one of the coefficients which minimizes the power of the signal X5_tel, and the adaptive pseudo pass transfer function filter 51 functions with use of the identified coefficient.

<Effects of Fifth Embodiment>

As has been described above, the fifth embodiment has, in addition to the effects of the fourth embodiment, effects which follow.

Even when such a telephone set 54 as not to be available its characteristic at the time of designing the terminal is connected to the terminal, the adaptive pseudo pass transfer function filter 51 is caused to learn only when the telephone set 54 is connected to the hybrid circuit for the first time or only when "a call is established" for the first time, and thereafter the processing is carried out by using the adaptive pseudo pass transfer function filter 51 after learned. As a result, the near end speaker can talk with an excellent quality of sound having the echo sufficiently removed while avoiding from feeling uncomfortable due to the convergence signal of the adaptive pseudo pass transfer function filter 51 of the echo canceller; whereas, the far end speaker can talk over the far end speaker with an excellent quality of sound having the echo sufficiently removed without occurrence of lack of part of the far end speaker's voice.

Sixth Embodiment

The sixth embodiment of the present invention will next be described.

Figure 6:
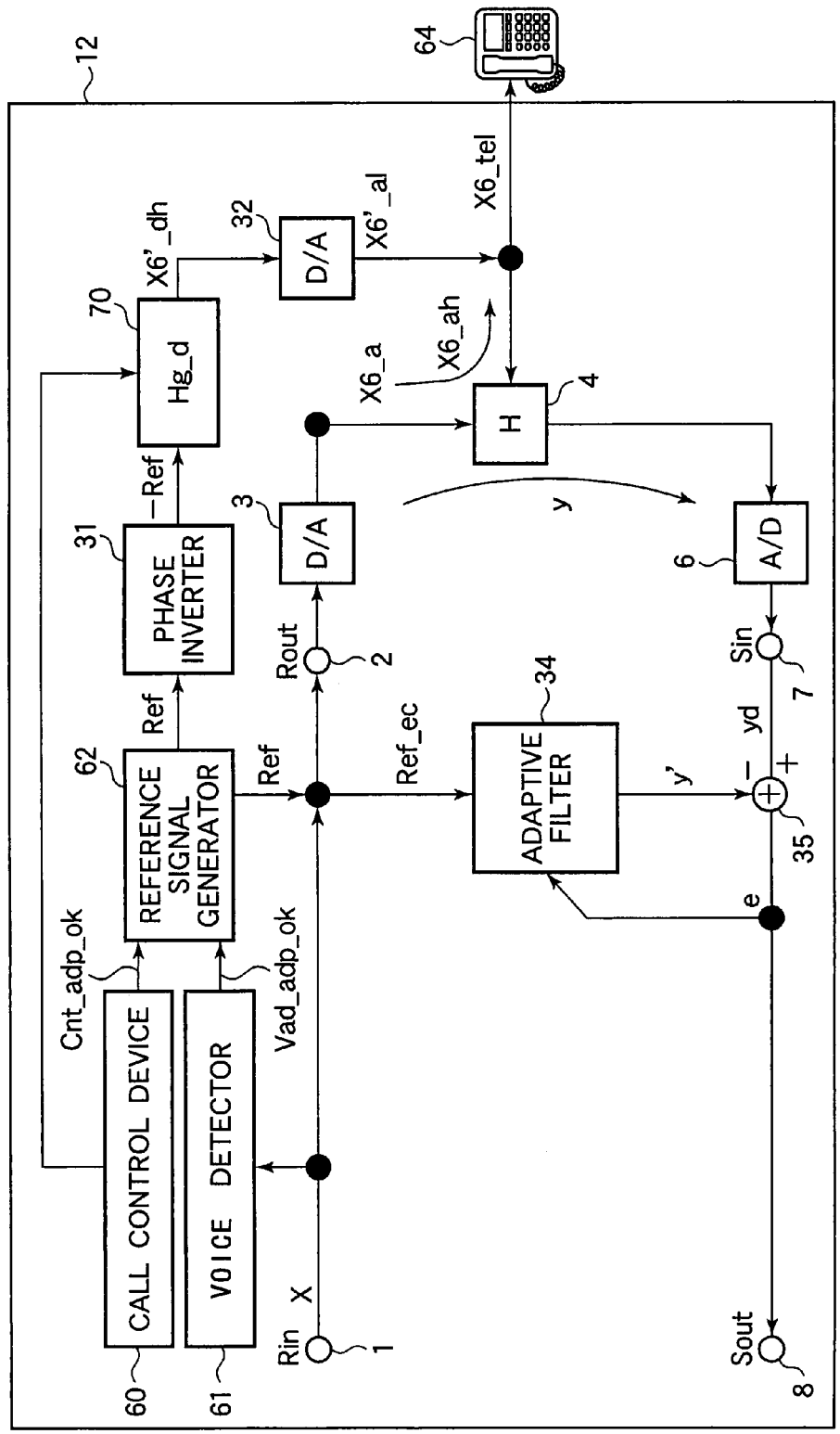
FIG. 6 is a schematic block diagram showing a communication terminal device with an echo canceller according to the sixth embodiment of the present invention.

FIG. 6 is a schematic arrangement of a communication terminal device with an echo canceller according to the sixth embodiment of the present invention. The most parts of the entire arrangement of the communication terminal device with the echo canceller according to this embodiment are the same as those of the communication terminal device according to the aforementioned fourth embodiment. Thus, the constituent elements that are the same as those in the fourth embodiment are assigned the same reference numerals or symbols, and a description will be made with attaching importance of different constituent elements while a description of the same constituent elements is omitted.

The communication terminal device of this embodiment is different from the communication terminal device of the fourth embodiment in the respect that a call control device 60 and a voice detector 61 are newly provided and the telephone set 5-3 is replaced with a telephone set 64. Except for the above-described points, the communication terminal device with the echo canceller according to this embodiment is the same as that according to the fourth embodiment.

The present invention is designed to cope with such a situation that a PBX (not shown) or a telephone set to be connected to the hybrid circuit 4 is not determined yet. In the fourth embodiment, it is only required, for example, for the near end speaker to select once the pseudo pass transfer function filter 40 and to use it for the subsequent speech when the telephone set 5-3 is installed for the first time or when the telephone set is exchanged. However, when a PBX or the like is connected to the hybrid circuit 4, the telephone set of the near end speaker is changed each time when a call is established, and it is rare that the hybrid circuit 4 is connected to the same telephone set. Further, it may occur such a situation that, in once established call connection such as extension transfer, the characteristic of the selected pseudo pass transfer function filter 40 becomes already unsuitable upon the next call connection. In this case, it becomes difficult to operate and control the terminal device 12. More specifically, when the PBX is connected to the hybrid circuit 4 in the fourth embodiment, the PBX is provided between the telephone set 5-3 and the communication terminal device 12, so that the telephone set 5-3 and the communication terminal device 12 of the near end speaker are accommodated not in the same casing but in different casings. Therefore, it becomes difficult for the near end speaker to operate and control the terminal device 12 via the PBX.

In such a case, therefore, such a terminal device 12 as to be capable of training the adaptive filter 34 or automatically selecting the coefficient of the pseudo pass transfer function filter 40 is desired. In view of such a respect, the present invention is provided.

An echo canceller according to the sixth embodiment of the present invention will be described below with reference to FIG. 6. The communication terminal device of the sixth embodiment is different from the communication terminal device of the fourth embodiment in the respect that a telephone set 64, a call control device 60, and a voice detector 61 are newly provided, and in the operation of a reference signal generator 62. Since the other arrangement of this embodiment is the same as that of the fourth embodiment, its description is omitted here.

The call control device 60 controls the output of the convergence signal of the adaptive filter 34 by the reference signal generator 62 in cooperation with the voice detector 61.

More specifically, the call control device 60 outputs, to the reference signal generator 62, a signal Cnt_adp_ok for enabling the output of the convergence signal to the adaptive filter 34. That is, the call control device 60, when a call from the telephone set 64 is connected or when an extension transfer takes place by a PBX, which is not shown in the figure, detects the call connection or the generation of the extension transfer, and outputs to the reference signal generator 62 the signal Cnt_adp_ok for enabling the output of the convergence signal of the adaptive filter 34 for a predetermined constant time (e.g., ten seconds, but which is suitably determined according to various sorts of conditions and thus which is not specifically limited to ten seconds).

Further, the call control device 60 is used to select optimum one of the several pseudo pass transfer function filters 40 previously stored by the designer on the basis of a call destination telephone number. For example, one pseudo pass transfer function filter 70 is selected from a table showing a correlation between the call destination telephone number and the pseudo pass transfer function filter 70 before the output −Ref is supplied to the pseudo pass transfer function filter 70.

The voice detector 61 detects the presence or absence of a voice (sound) in the input signal to the Rin 1 (voice (sound) detection), and selectively outputs a control signal in accordance with the presence or absence of the voice (sound). As the voice (sound) detecting method, for example, such a method as described in Japanese Patent Application Kokai (Laid-Open) Publication No. H10-301600 suggested earlier by the inventors of this application may be employed. Another method may be employed so long as it can determined the presence or absence of a person's voice (sound) in the signal, and the present invention is not limited to this method. The voice detector 61 is arranged so that, when the detection result is "voice (sound) present", the voice detector 61 outputs no signal to the reference signal generator 62; and when the detection result is "no-voice (sound) (voice (sound) absent)", the voice detector 61 outputs to the reference signal generator 62 a signal Vad_adp_ok for prompting the reference signal generator 62 to output the convergence signal of the adaptive filter 34.

The reference signal generator 62 outputs an exclusive signal Ref only when both of the signals Cnt_adp_ok and Vad_adp_ok are present. In other words, so long as the signal Cnt_adp_ok from the call control device 60 and the signal Vad_adp_ok from the voice detector 61 are both present, the reference signal generator 62 outputs the exclusive signal Ref such as Gaussian noise for causing the adaptive filter 34 to converge to the phase inverter 31, the Rout 2, and the adaptive filter 34.

The output of the reference signal Ref from the reference signal generator 62 is executed only when the far end speaker's voice detection is "no." This is for the reasons which follow.

When there is present an exchange such as a PBX between the telephone set 64 and the hybrid circuit 4, the near end speaker cannot operate the terminal with the echo canceller any more. In other words, the near end speaker cannot adjust the pseudo pass transfer function filter 70 in accordance with the type or the like of the telephone set 64. With respect to the telephone set 64 of the near end speaker, it is considered for the near end speaker, after the installation of the speech system, to connect a telephone set 64 having such a characteristic that the designer cannot foresee at the then design time by upgrading the telephone set 64 to a new one or the like. At this time, it is a stereotyped practice to solve the problem by the designer who again increases the number of choices of the pseudo pass transfer function filters 70. However, it often occurs such a situation that options of the pseudo pass transfer function filters 70 to be selected cannot be increased due to the memory capacity limitation of the device or the like.

In such a case, the optimum pseudo pass transfer function filter 70 is selected from the existing choices as the next method. At this time, the pseudo pass transfer function filter 70 cannot completely simulate the pass transfer function Hg of the hybrid circuit 4 based on a combination between the hybrid circuit 4 and the new telephone set 64. Thus the output of the pseudo pass transfer function filter 70 cannot completely cancel the signal for convergence of the adaptive filter 34 leaked from the hybrid circuit 4, and the near end speaker somewhat hears the leaked signal. For this reason, the near end speaker is required to put considerable effort into distinguishing between noise and the voice (sound). As a result, the near end speaker feels unnatural, she/he feels increasingly fatigued with the speech because she/he has to concentrate on the voice (sound) alone, and the speech quality is degraded.

In the conventional art, since the signal for convergence of the adaptive filter 34 is always generated regardless of the presence or absence of the voice (sound) signal at the Rin 1, the near end speaker is always exposed to the convergence signal and she/he feels more unnatural.

To avoid this, in this embodiment, the voice detector 61 is provided to cause the adaptive filter 34 to converge for a constant time duration (ten seconds in this embodiment) after a call is established and only for a voiceless (soundless) duration. For a far end speaker's voice present duration, the signal for causing the adaptive filter 34 to converge is stopped to output a noiseless voice (sound) to the near end speaker, thus lightening fatigue feeling of the near end speaker and increasing the speech quality.

<Echo Canceling Method of Sixth Embodiment>

The communication terminal device with the echo canceller arranged as mentioned above operates as follows. The operation of the communication terminal device will be described below with reference to FIG. 6.

When a far end speaker's signal X is input to the Rin 1, the voice detector 61 detects the presence or absence of a voice (sound) in the input signal (voice (sound) detection). When a detection result at the voice detector 61 is "no-voice (sound)", the voice detector outputs signal "Vad_adp_ok" to the reference signal generator 62. When the detection result is "no-voice (sound)", the voice detector 61 outputs a signal Vad_adp_ok to prompt the reference signal generator 62 to output the convergence signal of the adaptive filter 34.

Meanwhile, when a call at the telephone set 64 is connected or when an extension transfer occurs by a PBX, which is not shown in the figure, or the like, the call control device 60 detects the fact, and outputs to the reference signal generator 62 a signal Cnt_adp_ok to enable the output of the convergence signal of the adaptive filter 34.

The reference signal generator 62 waits for the signals from the call control device 60 and from the voice detector 61. Only when the signal Cnt_adp_ok from the call control device 60 and the signal Vad_adp_ok from the voice detector 61 are both present, the reference signal generator 62 is operated. More specifically, when the both signals are output, the reference signal generator 62 outputs the exclusive signal Ref for causing the adaptive filter 34 to converge to the phase inverter 31, the Rout 2, and the adaptive filter 34 only for a constant time (e.g., ten seconds) corresponding to the output time duration of the signal Cnt_adp_ok.

The operation of the phase inverter 31, to which the signal Ref is output, is the same as that of the fourth embodiment. An output −Ref of the phase inverter 31 is supplied to the pseudo pass transfer function filter 70. Meanwhile, the call control device 60, on the basis of a call destination telephone number or the like, selects optimum one of the pseudo pass transfer function filter 70 previously stored in the aforementioned table before the output −Ref is supplied to the pseudo pass transfer function filter 70.

Before the output −Ref of the phase inverter 31 is supplied to the pseudo pass transfer function filter 70, the call control device 60 already completes the selection of the pseudo pass transfer function filter 70. An output X6'_dh of the pseudo pass transfer function filter 70 is supplied to the D/A 32, where the input signal is converted into an analog signal X6'_ah as its output.

The output of the reference signal generator 62 passes through the Rout 2, the D/A 3 and the hybrid circuit 4 to form a signal X6_ah, which in turn is output from the hybrid circuit 4. The output of the reference signal generator 62 is also input to the adaptive filter 34. Since the operation of the adaptive filter 34 is the same as that in the third embodiment, explanation about the operation is omitted.

The signal X6_ah output from the hybrid circuit 4 toward the telephone set 64 is, in analog form, added to the signal X6'_ah output from the D/A 32 to be canceled each other. Although the signals X6_ah and X6'_ah are added together in analog form in this example, the signals may be once digitalized and then the digitalized signals X6_ah and X6'_ah may be added together at a digital adder, as a matter of course.

A signal X6_tel after the addition is not heard to the near end speaker because the signals X6_ah and X6'_dh are canceled each other.

As has been described above, the reference signal output from the reference signal generator 62 is executed only when the far end speaker's voice (sound) detection of the voice detector 61 is "no-voice (sound)". More specifically, the adaptive filter 34 is converged for a constant duration (ten seconds in this embodiment) after a call is established and for a voiceless (soundless) duration. For a far end speaker's voice (sound)-absent duration, the signal for causing the adaptive filter 34 to converge is stopped and a noiseless voice (sound) is supplied to the near end speaker.

<Effects of Sixth Embodiment>

As has been described above, even when the exchange of the telephone set 64 or the frequent modification of the telephone set based on the PBX causes the characteristic of the pseudo pass transfer function filter 70 to be shifted from its original optimum characteristic with a very small error after the device setting, the convergence signal of the adaptive filter 34 is generated only for the voiceless (soundless) duration, and, for the voice (sound)-present duration, the signal for causing the adaptive filter 34 to converge is not output. As a result, the near end speaker can less feel unnatural to the convergence signal of the adaptive filter 34.

As a result, fatigue feeling of the near end speaker can be lightened and the speech quality can be increased.

In this embodiment, the pseudo pass transfer function filter 70 has been selected on the basis of the call destination telephone number of the call control device. However, an IP address for an IP telephone set increasingly spread in these years may be used as information for the selection of the filter 70, as a matter of course.

Seventh Embodiment

The seventh embodiment of the present invention will next be described.

Figure 7:
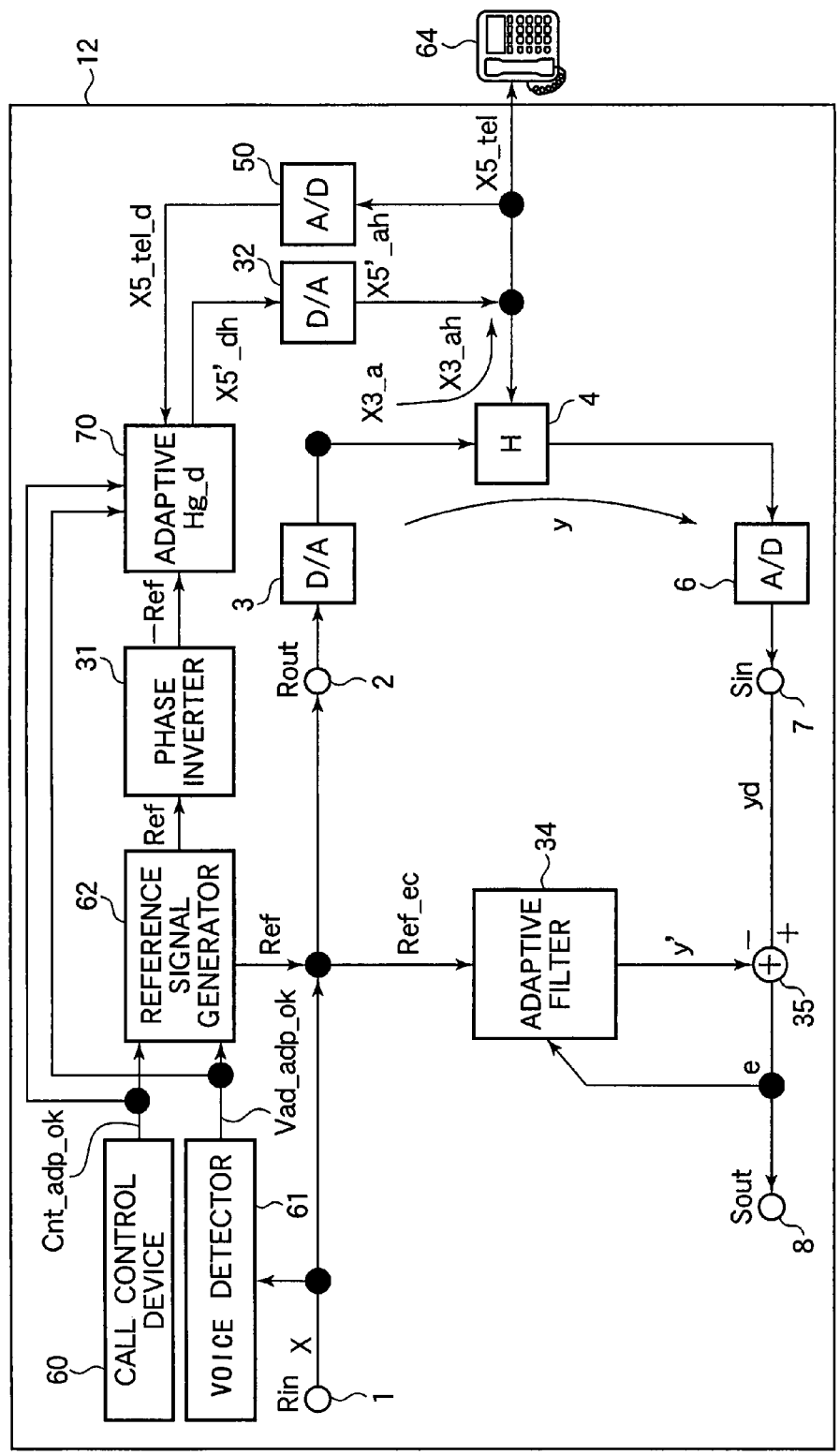
FIG. 7 is a schematic block diagram showing a communication terminal device with an echo canceller according to the seventh embodiment of the present invention.

FIG. 7 is a schematic block diagram showing a communication terminal device with an echo canceller according to the seventh embodiment of the present invention. The most parts of the entire arrangement of the communication terminal device with the echo canceller according to this embodiment are the same as those of the communication terminal device according to the aforementioned fifth embodiment. Thus, the constituent elements that are the same as those in the fifth embodiment are assigned the same reference numerals or symbols, and a description will be made with attaching importance of different constituent elements while a description of the same constituent elements is omitted.

The communication terminal device of this embodiment is different from the communication terminal device of the fifth embodiment in the respect that a call control device 60 and a voice detector 61 are newly provided and the adaptive pseudo pass transfer function filter 51 is replaced with an adaptive pseudo pass transfer function filter 70. The call control device 60 and the voice detector 61 are substantially the same as those in the communication terminal device of the sixth embodiment.

The seventh embodiment is based on the fifth embodiment. An improvement over the fifth embodiment is substantially the same as an improvement of the sixth embodiment over the fourth embodiment. In other words, when the telephone set is replaced with a different telephone set upon each connection of the telephone set, that is, when the hybrid circuit is connected to a PBX, which is not shown in the figure, or the like, the near end speaker tries to operate the communication terminal device 12 of the present invention for the purpose of improving the speech quality, she/he cannot operate the terminal device 12 of the present invention. In order to cope with the defect, this embodiment is provided.

In the fifth embodiment, for example, by making the adaptive pseudo pass transfer function filter 51 adaptive only once upon the initial installation as mentioned above, the adaptive pseudo pass transfer function filter 51 already converged through the previous call connection is used for the second time on to remove the adaptive filter convergence signal and to avoid the near end speaker from hearing it. However, when a different telephone set is connected upon each call connection, the adaptive pseudo pass transfer function filter 51 already converged in the previous time cannot be used any more because a different telephone set provides a different characteristic. Further, the probability that the convergence of the adaptive pseudo pass transfer function filter 51 causes the occurrence of lack of part of the far end speaker's voice in the fifth embodiment may be greater than the same probability in the fourth embodiment, in some cases, as will be described later.

Problems in the fifth embodiment will be described below. In the fifth embodiment, such a method (using sequential algorithm) that a mixture signal of the far end speaker's signal X and the adaptive filter convergence signal Ref is used to cause the adaptive filter 34 to converge, and the signal X5_tel corresponding to an addition of the two analog signals X3_ah and X5'_ah is used as the residue signal to cause the adaptive pseudo pass transfer function filter 51 to converge. Accordingly, in the aforementioned fifth embodiment, the adaptive pseudo pass transfer function filter 51 is converged so as to minimize the power of the signal X5_tel. In other words, the mixture signal of the far end speaker's signal X and the adaptive filter convergence signal Ref may cause too much minimization, with the result that even far end speaker's voice may be possibly canceled to degrade the voice (sound). There may occur a possibility that the far end speaker's voice is missing or becomes smaller.

In the present invention, even when the terminal device 12 arranged based on the fifth embodiment is applied to a system including a PBX and the like, the aforementioned problem can be solved.

To this end, the call control device 60, the voice detector 61, and the adaptive pseudo pass transfer function filter 70 are provided.

<Echo Canceling Method of Seventh Embodiment>

The operation of a seventh embodiment will be described with reference to FIG. 7.

The seventh embodiment is different from the fifth embodiment only in the operation of the adaptive pseudo pass transfer function filter 70. Thus the explanation of the other constituent elements is omitted. Further, the call control device 60 and the voice detector 61 are substantially the same as those in the fifth embodiment.

An output signal Vad_adp_ok from the voice detector 61 and an output signal Cnt_adp_ok from the call control device 60 are supplied to the adaptive pseudo pass transfer function filter 70. Only when the adaptive pseudo pass transfer function filter 70 receives the signals Vad_adp_ok and Cnt_adp_ok, the adaptive pseudo pass transfer function filter 70 executes the convergence operation of the adaptive pseudo pass transfer function filter 70 using signals −Ref and X5_tel_d. In other words, only when there is no voice (sound) signal component of the far end speaker on the signal X3_ah line, the adaptive pseudo pass transfer function filter 70 executes the convergence operation of itself.

<Effects of Seventh Embodiment>

From the above arrangement, in addition to the effects of the fifth embodiment, when a call is connected to the telephone set 64 or when an extension transfer takes place, the convergence is attained so long as the far end speaker's signal is in its "no-voice (sound) state." Thus the adaptive pseudo pass transfer function filter 70 is not converged so as to minimize the power of the far end voice (sound). As a result, even when the frequent change of the telephone set due to the PBX causes the characteristic of the adaptive pseudo pass transfer function filter 70 to be converged upon each telephone set change, occurrence of lack of part of the far end speaker's voice can be avoided. Further, since the presence of the far end speaker's voice causes no generation of the adaptive filter convergence signal, the near end speaker can be suppressed from feeling unnatural when listening to the adaptive filter convergence signal. As a result, fatigue feeling of the near end speaker can be lightened and the speech quality can be increased.

Eight Embodiment

The eighth embodiment of the present invention will next be described.

Figure 8:
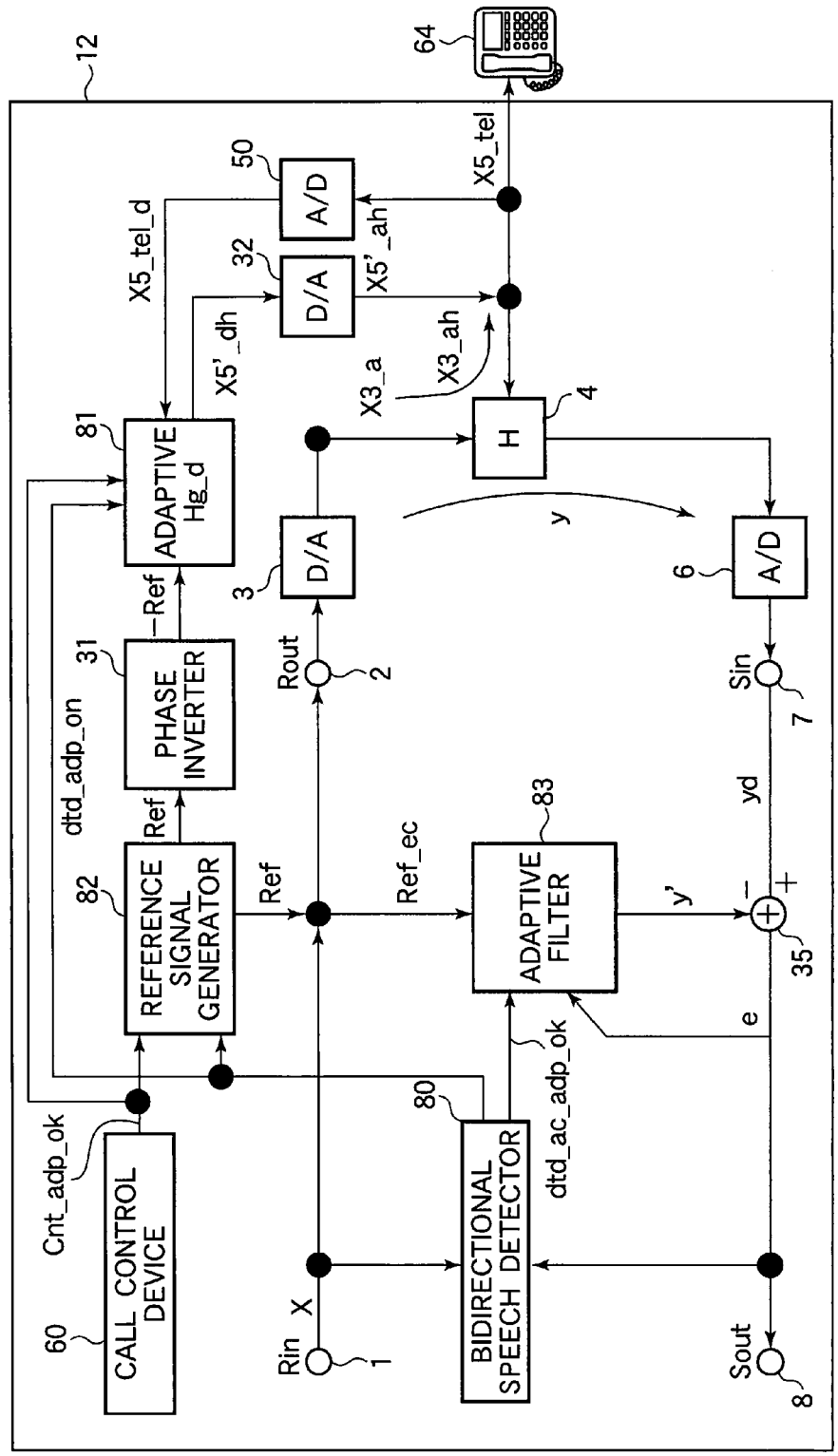
FIG. 8 is a schematic block diagram showing a communication terminal device with an echo canceller according to the eighth embodiment of the present invention.
Figure 9:
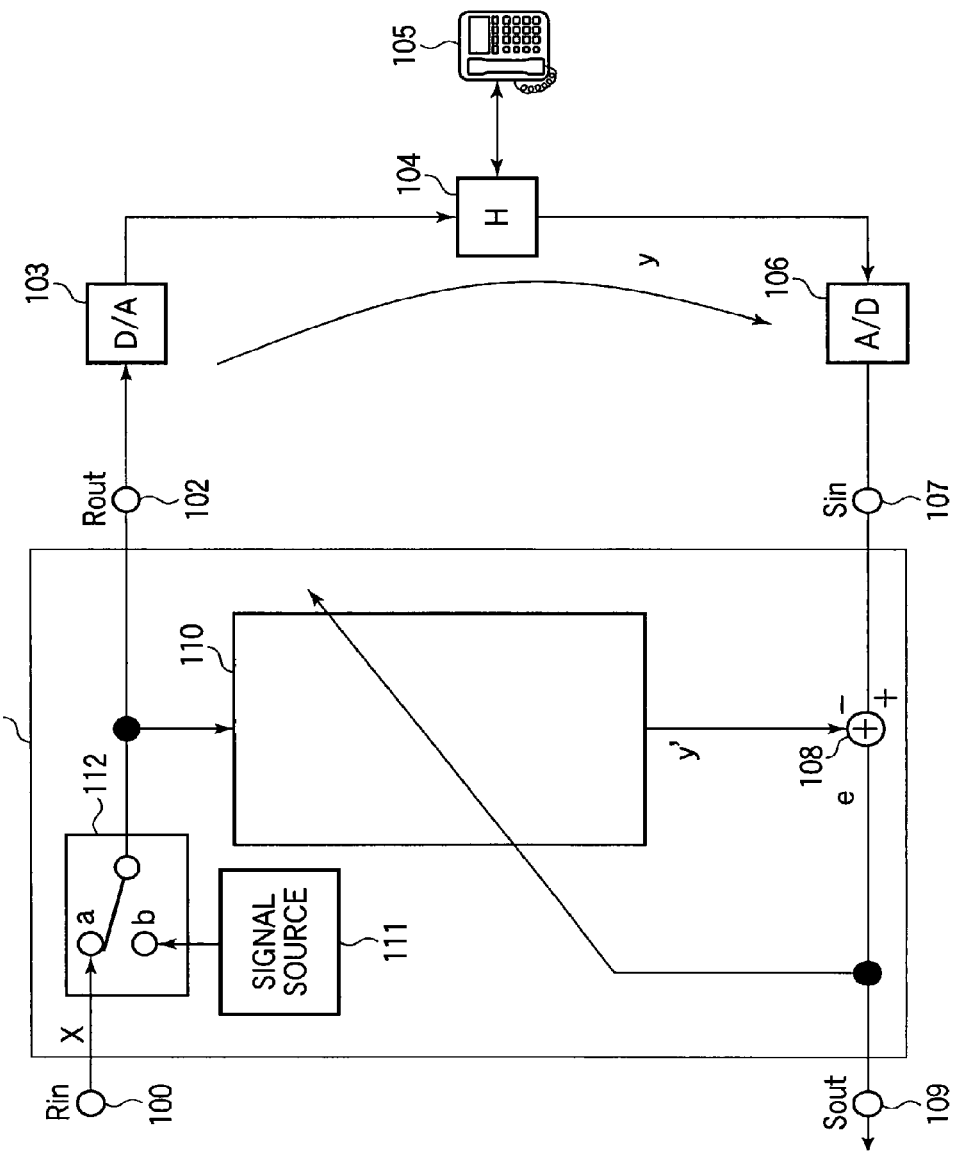
FIG. 9 is a schematic block diagram showing a conventional communication terminal device with an echo canceller.

FIG. 8 is a schematic block diagram showing a communication terminal device with an echo canceller according to the eighth embodiment of the present invention. The most parts of the entire arrangement of the communication terminal device with the echo canceller according to this embodiment are the same as those of the communication terminal device according to the aforementioned seventh embodiment. Thus, the constituent elements that are the same as those in the seventh embodiment are assigned the same reference numerals or symbols, and a description will be made with attaching importance of different constituent elements while a description of the same constituent elements is omitted.

The communication terminal device with the echo canceller according to this embodiment is different from that in the seventh embodiment in the respect that a bidirectional speech detector 80 is provided, an adaptive pseudo pass transfer function filter 81 is provided in place of the adaptive pseudo pass transfer function filter 70, a reference signal generator 82 is provided in place of the reference signal generator 62, an adaptive filter 83 is provided in place of the adaptive filter 34, and the voice detector 61 is removed. Except for the above-described points, the communication terminal device with the echo canceller according to this embodiment is the same as that according to the seventh embodiment.

The bidirectional speech detector 80 detects both voices (sounds) at the Sout 8 and at the Rin 1. In other words, the bidirectional speech detector 80 detects not only far end speaker's voice but also near end speaker's voice. The bidirectional speech detector 80 is attained, for example, by connecting it to another Sout 8 together with the voice detector 61 in the seventh embodiment and operating it with inputs both from the Rin 1 and from the Sout 8. Any type of such a detector 80 may be used, so long as it can detect near end speaker's voice and far end speaker's voice.

The bidirectional speech detector 80 receives the signals from the Sout 8 and from the Rin 1 to detect one of speech states which follow.

Speech state 1: The voice (sound) of the remote end speaker is present (hereinafter referred to as a "receive talk state").

Speech state 2: The voice (sound) of the near end speaker is present (hereinafter referred to as a "send talk state").

Speech state 3: The voices (sounds) of the near end speaker and the far end speaker are present (hereinafter referred to as a "double talk state").

Speech state 4: The voices (sounds) of both speakers are absent (hereinafter referred to as a "no-voice (sound) state").

Only when detecting the no-voice (sound) state, the bidirectional speech detector 80 outputs a convergence enable signal dtd_adp_on to the adaptive pseudo pass transfer function filter 81 and also to the reference signal generator 82. Only when detecting the receive talk state and the no-voice (sound) state, the bidirectional speech detector 80 outputs an adaptive filter convergence enable signal dtd_ec_adp_ok to the adaptive filter 83.

Only when receiving the signal dtd_adp_on from the bidirectional speech detector 80 and the signal Cnt_adp_ok from the call control device 60, the reference signal generator 82 outputs the signal Ref for convergence of the adaptive filter 83 to the adaptive filter 83, to the Rout 2, and also to the phase inverter 31. Under conditions other than the above conditions, the reference signal generator 82 does nothing.

Only when receiving the signal dtd_ec_adp_on from the bidirectional speech detector 80 and the signal Cnt_adp_ok from the call control device 60, the adaptive pseudo pass transfer function filter 81 performs coefficient converging operation.

<Echo Canceling Method of Eighth Embodiment>

The communication terminal device with the echo canceller arranged as mentioned above operates as follows. The eighth embodiment is different from the seventh embodiment only in the operations of the adaptive pseudo pass transfer function filter 81, the reference signal generator 82, and the adaptive filter 83. Since the other arrangement of this embodiment is the same as that of the seventh embodiment, its description is omitted here.

The detection result of the bidirectional speech detector 80, the converging operation of the adaptive pseudo pass transfer function filter 81, and the converging operation of the adaptive filter 83 are as follows. Only in the no-voice (sound) state, the reference signal generator 82 outputs the signal Ref for convergence of the adaptive filter 83 to the adaptive filter 83, to the Rout 2, and also to the phase inverter 31. Only in the no-voice (sound) state, the adaptive pseudo pass transfer function filter 81 also performs converging operation. Not only in the no-voice (sound) state but also in the receive talk state, the adaptive filter 83 performs converging operation. The adaptive filter 83 is not limited to the above example. For example, in the receive talk state, the adaptive filter 83 may operate to stop the converging operation.

The operations of the respective states based on the detection result of the bidirectional speech detector 80 are summarized as follows.

No-Voice (Sound) State:

The reference signal generator 82 outputs the signal Ref for convergence of the adaptive filter 83 to the adaptive filter 83, to the Rout 2, and also to the phase inverter 31. As a result, the adaptive pseudo pass transfer function filter 81 and the adaptive filter 83 also perform converging operation.

Receive Talk State:

In the receive talk state, the reference signal generator 82 does nothing. As a result, the reference signal generator 82 doesn't output the reference signal Ref and the adaptive pseudo pass transfer function filter 81 performs no converging operation. The reason why the reference signal is not output is as already mentioned in the seventh embodiment. In this embodiment, the adaptive filter 83 is arranged to perform its converging operation in the receive talk state. This is because, in the receive talk state, the adaptive filter 83 can receive the reference signal X, can receive an echo signal yd caused by the signal X, and thus can converged. In the receive talk state, as a matter of course, the adaptation of the adaptive filter 83 may also be stopped so that the adaptive filter 83 performs converging operation only when the determination result of the bidirectional speech detector 80 is the no-voice (sound) state.

Send Talk State:

The adaptive filter 83 performs no converging operation. This is because the far end signal X is not present in the send talk state, and thus the echo signal yd to be erased is also not present. The reference signal generator 82 also does nothing. Accordingly, the adaptive pseudo pass transfer function filter 81 also performs no converging operation. If the reference signal Ref is generated to start to cause the adaptive pseudo pass transfer function filter 81 to converge, then the signal X5_tel contains a voice (sound) sent from the near end speaker. As a result, the minimization of the signal X5_tel also causes the minimization (cancellation) of even the send voice (sound) to be transmitted from the near end speaker to the far end speaker, which is undesirable. Accordingly, the reference signal generator 82 does nothing and the adaptive pseudo pass transfer function filter 81 also performs no converging operation.

Double Talk State:

Since both voices (sounds) of the near end speaker and the far end speaker are present in this state, the adaptive pseudo pass transfer function filter 81 performs no converging operation for the reason described in the seventh embodiment. The adaptive filter 83 also performs no converging operation since the echo of the far end speaker's signal X and the send voice (sound) signal of the near end speaker are presented in a mixed state. As a matter of course, the reference signal generator 82 also does nothing.

As mentioned above, the reference signal generator 82, the adaptive filter 83, and the adaptive pseudo pass transfer function filter 81 are operated according to the detection result of the bidirectional speech detector 80. Thus, even when the control of a PBX, which is not shown in the figure, or the like generates a call connection transfer for example, the characteristic of the adaptive pseudo pass transfer function filter 81 is automatically adjusted to be optimum for each call establishment, the reference signal for convergence of the adaptive filter 83 is output in the optimum duration, and the convergence of the adaptive filter 83 is attained with the reference signal having a suitable level and a sufficient time duration. As a result, the far end speaker can be prevented from feeling uncomfortable to the echo.

In the presence of the near end speaker's signal, the convergence of the adaptive filter 83 is stopped. Thus the adaptive filter 83 can converge and accurately remove the echo while not disturbed by the voice (sound) signal of the near end speaker. The adaptive pseudo pass transfer function filter 81 can establish a good speech while the near end speaker is prevented from hearing unnecessary convergence noise and from feeling uncomfortable thereto.

<Effects of Eighth Embodiment>

In addition to the seventh embodiment, the reference signal generator 82 is arranged to generate the adaptive filter 83 convergence signal only in the no-voice (sound) state, the adaptive pseudo pass transfer function filter 81 is arranged to perform its converging operation only in the presence of the reference signal, the adaptive filter 83 is arranged to perform its converging operation only in the receive talk state and only in the no-voice (sound) state. Therefore, the adaptive filter 83 can be converted for a sufficient time with use of the signal having a sufficient level.

Since the adaptive pseudo pass transfer function filter 81 does not excessively cancel the far end voice (sound), occurrence of lack of part of the far end speaker's voice can also be avoided.

Since the adaptive pseudo pass transfer function filter 81 cancels the convergence reference signal of the adaptive filter 83 leaked in a direction toward the near end speaker, even the near end speaker can be prevented from hearing useless noise and feeling uncomfortable thereto.

As a result, there can be provided a communication terminal device with an echo canceller which can attain a good speech quality.

MODIFICATION

Explanation has been made in connection with the case where the terminal device is connected to a general telephone set in the foregoing first to eighth embodiments. However, the present invention may also be applied to a terminal device or the like made for IP telephone that is increasingly spread in these years.

In this case, the device can offer almost the same operations and effects as those of the foregoing embodiments.

What is claimed is:

1. A communication terminal device with an echo canceller for removing a true echo in communication, the true echo being generated by a hybrid circuit that outputs a signal to a telephone set, comprising:
   a pseudo signal generating circuit having the same or substantially the same characteristic as a characteristic of the hybrid circuit, the pseudo signal generating circuit generating a pseudo echo for canceling out the true echo, the pseudo echo having a phase opposite to a phase of the true echo,
   wherein the pseudo signal generating circuit includes:
      a phase inverter for inverting the phase of the same signal as a signal input to the hybrid circuit,
      a pseudo telephone set having the same or substantially the same electric impedance as the electric impedance of the telephone set, and
      a pseudo hybrid circuit for generating the pseudo echo, the pseudo hybrid circuit having the same or substantially the same characteristic as a characteristic of the true echo from the signal inverted by the phase inverter, the pseudo hybrid circuit outputting a signal to the pseudo telephone set.

2. The communication terminal device with the echo canceller according to claim 1, wherein the phase inverter is a digital signal phase inverter which inverts the phase of the signal when the signal is in a digital form.

3. A communication terminal device with an echo canceller for removing an echo in communication, the echo being generated by a hybrid circuit reflecting part of a far end speaker's signal, comprising;
   an adaptive filter for removing the echo;
   a reference signal generator for outputting an adaptive filter convergence signal to the adaptive filter; and
   a simulating means for generating a pseudo signal for cancelling out the adaptive filter convergence signal, the pseudo signal having a phase opposite to the adaptive filter convergence signal and being added to an input signal input to a telephone set through the hybrid circuit, the input signal being generated by adding the adaptive filter convergence signal to the far end speaker's signal.

4. The communication terminal device with the echo canceller according to claim 3,
   wherein the simulating means includes a pseudo pass transfer function calculator for simulating a pass transfer function of the hybrid circuit.

5. The communication terminal device with the echo canceller according to claim 3,
   wherein the simulating means includes a pseudo pass transfer function filter for simulating a pass transfer function of the hybrid circuit.

6. The communication terminal device with the echo canceller according to claim 3,
   wherein the simulating means includes an adaptive pseudo pass transfer function filter for generating a pseudo hybrid circuit pass signal.

7. The communication terminal device with the echo canceller according to claim 3,
   wherein the simulating means includes a digital signal phase inverter for inverting the phase of the adaptive filter convergence signal when the adaptive filter convergence signal is in a digital form.

8. The communication terminal device with the echo canceller according to claim 3, further comprising:
   a call control device for outputting a signal enabling output of the adaptive filter convergence signal for a predetermined constant time when a call is connected to the telephone set or when an extension transfer takes place; and
   a voice detector for outputting a signal prompting output of the adaptive filter convergence signal only when the far end speaker's signal is in a no-voice (sound) state;
   wherein the reference signal generator outputs the adaptive filter convergence signal only when the signal from the call control device and the signal from the voice detector are both present.

9. The communication terminal device with the echo canceller according to claim 8, wherein the simulating means includes:
   a phase inverter for inverting the phase of the adaptive filter convergence signal from the reference signal generator; and a pseudo pass transfer function filter which stores a plurality of pseudo pass transfer functions that simulates the pass transfer function of the hybrid circuit;

wherein the call control device selects optimum one of the plurality of pseudo pass transfer functions stored in the pseudo pass transfer function filter before an output of the phase inverter is supplied to the pseudo pass transfer function filter.

10. The communication terminal device with the echo canceller according to claim 3, further comprising:

a call control device for outputting a signal enabling output of a convergence signal for a predetermined constant time when a call is connected to the telephone set or when an extension transfer takes place; and a voice detector for outputting a signal prompting output of an adaptive filter convergence signal only when the far end speaker's signal is in a no-voice (sound) state;

wherein the simulating means includes an adaptive pseudo pass transfer function filter for performing converging operation only when the signal from the call control device and the signal from the voice detector are both present.

11. The communication terminal device with the echo canceller according to claim 3, further comprising:

a call control device for outputting a signal enabling output of the adaptive filter convergence signal for a predetermined constant time when a call is connected to the telephone set or when an extension transfer takes place; and a bidirectional speech detector for detecting a receive talk state that is a state when a far end speaker voice (sound) is present, a send talk state that is a state when a near end speaker voice (sound) is present, a double talk state that is a state when the near end speaker voice (sound) and the far end speaker voice (sound) are both present, and a no-voice (sound) state that is a state when both of the near end speaker voice (sound) and the far end speaker voice (sound) are absent; wherein the reference signal generator generates the adaptive filter convergence signal when a detection result of the bidirectional speech detector is the no-voice (sound) state, and the adaptive pseudo pass transfer function filter performs converging operation only when the signal from the reference signal generator is present.

12. An echo canceling method for a communication terminal device for removing a true echo in communication, the true echo being generated by a hybrid circuit, the hybrid circuit outputting a signal to a telephone set, comprising the steps of:

inverting the phase of the same signal as a signal input to the hybrid circuit; and generating a pseudo echo having the same or substantially the same characteristic as a characteristic of the true echo from the inverted signal, the pseudo echo being generated by a pseudo hybrid circuit, the pseudo hybrid circuit outputting a signal to a pseudo telephone set, the pseudo telephone set having the same or substantially the same electric impedance as electric impedance of the telephone set.

13. The echo canceling method for the communication terminal device according to claim 12, wherein the phase is inverted when the signal is in a digital form.

14. An echo canceling method for a communication terminal device for removing an echo in communication, the echo being generated by a hybrid circuit reflecting part of a far end speaker's signal, comprising the steps of:

removing the echo by an adaptive filter;

outputting an adaptive filter convergence signal to the adaptive filter; and generating a pseudo signal for cancelling out the adaptive filter convergence signal, the pseudo signal having a phase opposite to the adaptive filter convergence signal and being added to an input signal input to a telephone set through the hybrid circuit, the input signal being generated by adding the adaptive filter convergence signal to the far end speaker's signal.

15. The echo canceling method for the communication terminal device according to claim 14, wherein the step of generating the pseudo signal includes a step of a digital signal phase inverter for inverting the phase of the adaptive filter convergence signal when the adaptive filter convergence signal is in a digital form.

16. The echo canceling method for the communication terminal device according to claim 14, further comprising the steps of:

outputting a signal enabling output of the adaptive filter convergence signal for a predetermined constant time when a call is connected to the telephone set or when an extension transfer takes place; and outputting a signal prompting output of the adaptive filter convergence signal only when the far end speaker's signal is in a no-voice (sound) state;

wherein the adaptive filter convergence signal is output only when the signal enabling output of the adaptive filter convergence signal and the signal prompting output of the adaptive filter convergence signal are both present.

17. The echo canceling method for the communication terminal device according to claim 16, wherein the step of generating the pseudo signal includes steps of;

inverting the phase of the adaptive filter convergence signal; and selecting optimum one of a plurality of pseudo pass transfer functions that simulates the pass transfer function of the hybrid circuit before the inverted signal is supplied.

18. The echo canceling method for the communication terminal device according to claim 14, further comprising steps of:

outputting a signal enabling output of the adaptive filter convergence signal for a predetermined constant time when a call is connected to the telephone set or when an extension transfer takes place; and outputting a signal prompting output of the adaptive filter convergence signal only when the far end speaker's signal is in a no-voice (sound) state;

wherein the step of generating the pseudo signal includes a step of performing converging operation only when the signal enabling output of the adaptive filter convergence signal and the signal prompting output of the adaptive filter convergence signal are both present.

19. The echo canceling method for the communication terminal device according to claim 16, further comprising steps of:

outputting a signal enabling output of the adaptive filter convergence signal for a predetermined constant time when a call is connected to the telephone set or when an extension transfer takes place; and detecting a receive talk state that is a state when a far end speaker voice (sound) is present, a send talk state that is a state when a near end speaker voice (sound) is present, a double talk state that is a state when the near end speaker voice (sound) and the far end speaker voice (sound) are both present, and a no-voice (sound) state that is a state when both of the near end speaker voice (sound) and the far end speaker voice (sound) are absent; wherein
the adaptive filter convergence signal is generated when a detection result of the step of detecting is the no-voice (sound) state, and
the step of generating the pseudo signal includes a step of performing converging operation only when the signal enabling output of the adaptive filter convergence signal is present.

* * * * *